US010909841B2

(12) United States Patent
Inoue et al.

(10) Patent No.: US 10,909,841 B2
(45) Date of Patent: Feb. 2, 2021

(54) DATA COLLECTION SYSTEM

(71) Applicant: NEC Corporation, Tokyo (JP)

(72) Inventors: Tetsuo Inoue, Tokyo (JP); Toru Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 311 days.

(21) Appl. No.: 15/781,307

(22) PCT Filed: Nov. 15, 2016

(86) PCT No.: PCT/JP2016/083814
§ 371 (c)(1),
(2) Date: Jun. 4, 2018

(87) PCT Pub. No.: WO2017/098866
PCT Pub. Date: Jun. 15, 2017

(65) Prior Publication Data
US 2018/0365977 A1    Dec. 20, 2018

(30) Foreign Application Priority Data

Dec. 10, 2015  (JP) ................................. 2015-241130

(51) Int. Cl.
*G08C 17/02*    (2006.01)
*H04W 4/38*    (2018.01)
(Continued)

(52) U.S. Cl.
CPC ............. *G08C 17/02* (2013.01); *G08C 15/06* (2013.01); *G08C 19/00* (2013.01); *H04Q 9/00* (2013.01); *H04Q 9/04* (2013.01); *H04W 4/38* (2018.02); *H04W 4/70* (2018.02); *H04W 28/10* (2013.01); *H04W 88/16* (2013.01)

(58) Field of Classification Search
CPC ..................................................... G08C 17/02
See application file for complete search history.

(56) References Cited

U.S. PATENT DOCUMENTS

| 2007/0067742 | A1 | 3/2007 | Takaoka et al. |
| 2015/0012147 | A1* | 1/2015 | Haghighat-Kashani ..................... G06Q 30/02 700/291 |
| 2016/0057561 | A1 | 2/2016 | Kami |

FOREIGN PATENT DOCUMENTS

| JP | 2007-080190 A | 3/2007 |
| JP | 2009-169888 A | 7/2009 |

(Continued)

OTHER PUBLICATIONS

Norio Sato, et al., "Development of a Sensor Data Collecting System for Health Monitoring of Railway Structures", Railway Technical Research Institute, RTRI Report, Jun. 2008, pp. 35-40, vol. 22, No. 6.

(Continued)

*Primary Examiner* — Manuel A Rivera Vargas
(74) *Attorney, Agent, or Firm* — Sughrue Mion, PLLC

(57) ABSTRACT

A gateway device thins a plurality of devices to select a plurality of transmission target devices from among the plurality of devices, and transmits data of the transmission target devices to a server device. The server device receives the data of the transmission target devices from the gateway device, and uses the data of the transmission target devices to estimate a value of data of a removed device by interpolation.

6 Claims, 20 Drawing Sheets

(51) Int. Cl.
  *G08C 15/06*   (2006.01)
  *G08C 19/00*   (2006.01)
  *H04Q 9/00*    (2006.01)
  *H04W 28/10*   (2009.01)
  *H04W 4/70*    (2018.01)
  *H04Q 9/04*    (2006.01)
  *H04W 88/16*   (2009.01)

(56) References Cited

FOREIGN PATENT DOCUMENTS

| JP | 2012-199726 A | 10/2012 |
| JP | 2014-049010 A | 3/2014 |
| JP | 2014-209311 A | 11/2014 |
| JP | 2015-028742 A | 2/2015 |

OTHER PUBLICATIONS

Nayuta Ishii, et al., "An Integration Method of Heterogeneous and Multi-resolutional Sensor Data Utilizing Spatial Interpolation", Information Processing Society of Japan, Database, Mar. 2008, pp. 44-58, vol. 49, No. SIG7 (TOD37).

Hao Xue, et al., "A Method of Efficient Event-driven Data Collection in M2M System", Proceedings of the 76$^{th}$ National Convention of Information processing Society of Japan, Mar. 11, 2014, pp. 9-10, vol. 2014, No. 1.

International Search Report for PCT/JP2016/083814 dated Feb. 21, 2017 [PCT/ISA/210].

\* cited by examiner

FIG. 8A $$Z(x) = \frac{\sum_{i=1}^{n} w_i z_i}{\sum_{i=1}^{n} w_i}$$

FIG. 8B $$w_i = \frac{1}{d_i^2}$$

FIG. 9A
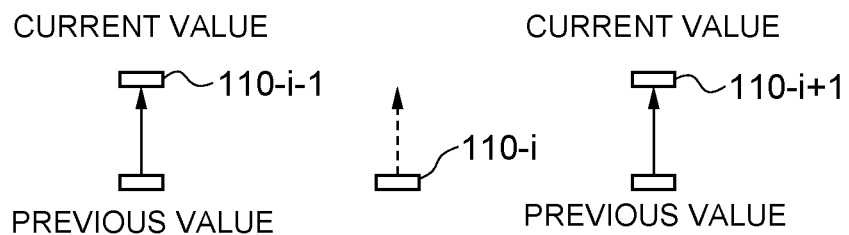
FIG. 9B
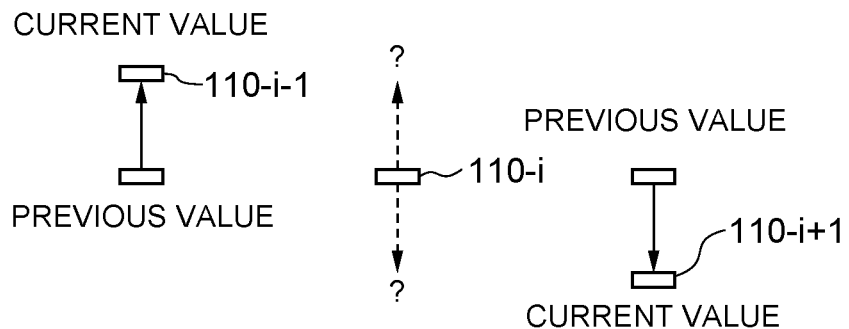
FIG. 9C
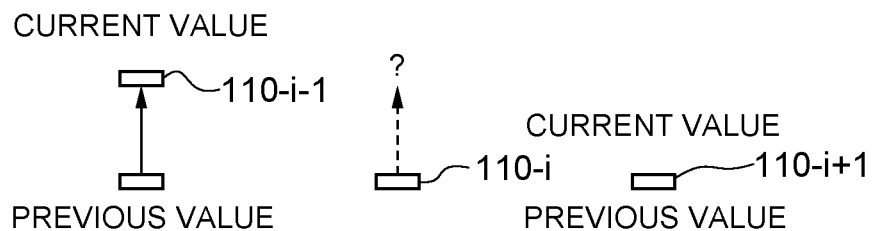
FIG. 9D
VARIANCE VALUE OF $\Delta Z_i < \alpha$

FIG. 15

$$\text{THINNING RATE} = \begin{cases} a & \text{if} \quad \beta \leqq \text{VARIANCE VALUE OF } \Delta Z_i < \alpha \\ b & \text{if} \quad \text{VARIANCE VALUE OF } \Delta Z_i < \beta \end{cases}$$

DATA COLLECTION SYSTEM

TECHNICAL FIELD

The present invention relates to a data collection system, a data collection method, a gateway device, a server device, and a program.

BACKGROUND ART

A sensor data collection system as described below is proposed and in practical use. The sensor data collection system includes a plurality of devices having sensors, one or more gateway devices collecting data detected by the sensors from the devices, and a server device collecting the sensor data from the gateway devices via a network.

For example, a sensor data collection system configured to transmit specified data at a specified transmission time from a gateway device to a server device via a network is proposed as a first related technique that is related to the present invention (for example, see Patent Document 1). According to the first related technique, the gateway device temporarily accumulates sensor data collected from the device and, on time, for example, at 10 a.m. defined as a transmission time, transmits data defined by a transmission definition ID to the server device via the network. Moreover, for example, every time 86400 seconds defined as a transmission time passes, the gateway device transmits data defined by a transmission definition ID to the server device via the network. Moreover, for example, for every movement of 100 km defined as a transmission time, the gateway device transmits data defined by a transmission definition ID to the server device via the network.

Further, a sensor data collection system configured to reduce a transmission volume from a gateway device to a server device is proposed as a second related technique that is related to the present invention (for example, see Non-Patent Document 1). According to the second related technique, either when sensor data transmitted from each node radio equivalent to a device by using ZigBee radio reaches a certain amount or when a certain period passes, a collection base station equivalent to the gateway device wirelessly transmits all collected sensor data to the server device through a mobile phone network. In the second related technique, if a compression and measurement value of transmission data is the same as the last measurement data, a transmission volume is reduced by omitting transmission of the measurement data.

On the other hand, the following technique is proposed as a third related technique that is related to the present invention (for example, see Patent Document 2). According to the technique, in a device that verifies and visualizes sensor data of equipment (for example, a cooling water outlet temperature) on the basis of its time-series change, with the use of a history of sensor data at a current inspection and sensor data at a past inspection, a change of sensor data at and after the current inspection is predicted, and prediction data (a prediction value or a prediction range) is obtained.

Further, a sensor data collection system configured to, in a case where a sensor distribution density is low and therefore a device having a sensor is not present at a point desired by the user, estimate a sensor value at a designated point by interpolation from sensor data of a nearby device is proposed as a fourth related technique that is related to the present invention (for example, see Non-Patent Document 2).

Patent Document 1: Japanese Unexamined Patent Application Publication No. JP-A 2015-028742
Patent Document 2: Japanese Unexamined Patent Application Publication No. JP-A 2014-049010
Non-Patent Document 1: Railway Technical Research Institute, RTRI Report, Vol. 22 No. 6, June 2008, 35-40 pp., Norio SATO, et. al., "Development of a Sensor Data Collecting System for Health Monitoring of Railway Structures"
Non-Patent Document 2: Information Processing Society of Japan, Database, Vol. 49, No. SIG7 (TOD37), Nayuta ISHII, et. al., "An Integration Method of Heterogeneous and Multi-resolutional Sensor Data Utilizing Spatial Interpolation"

In the sensor data collection system according to the first related technique described above, the gateway device temporarily accumulates sensor data collected from the device and, at a transmission time, transmits all the sensor data to the server device via the network. As a result, a load on the network increases. According to the second related technique described above, the amount of data transmitted from the gateway device to the server device via the network can be reduced, but transmission can be omitted only when a measurement value is the same as the last measurement value, so that a sufficient improvement effect cannot be obtained. Moreover, according to the third related technique described above, a change of sensor data at a future moment of a certain device is predicted on the basis of sensor data up to the present of the device, but the sensor data at the future moment is to be acquired as well as the sensor data before then. As a result, the amount of sensor data to be acquired is not reduced. Furthermore, according to the fourth related technique described above, sensor data at a point where there is no device is predicted from sensor data of a nearby device, but sensor data at a point where there is a device is acquired from the actual device. As a result, the amount of sensor data to be acquired is not reduced. Accordingly, even if the first to fourth related techniques are combined, it is difficult to effectively reduce the amount of data transmitted from the gateway device to the server device via the network.

SUMMARY

An object of the present invention is to provide a data collection system that solves the abovementioned problem.

A data collection system according to an exemplary embodiment of the present invention includes a gateway device configured to collect data from a plurality of devices and a server device configured to collect the data from the gateway device. The gateway device includes: a thinning means configured to select a plurality of transmission target devices from among the plurality of devices; and a communication means configured to transmit the data of the transmission target devices to the server device. The server device includes: a communication means configured to receive the data of the transmission target devices from the gateway device; and an interpolation means configured to use the data of the transmission target devices to perform estimation, by interpolation, of values of the data of devices having not been selected from among the plurality of devices.

Further, a data collection method according to another exemplary embodiment of the present invention is a data collection method executed by a data collection system including a gateway device configured to collect data from a plurality of devices and a server device configured to collect the data from the gateway device. The data collection method includes: by the gateway device, selecting a plurality of transmission target devices from among the plurality of devices, and transmitting the data of the transmission target devices to the server device; and by the server device, receiving the data of the transmission target devices from the gateway device, and using the data of the transmission target devices to perform estimation, by interpolation, of values of the data of devices having not been selected from among the plurality of devices.

Further, a gateway device according to another exemplary embodiment of the present invention is a gateway device collecting data from a plurality of devices and transmitting the data to a server device. The gateway device includes: a thinning means configured to select a plurality of transmission target devices from among the plurality of devices; and a communication means configured to transmit the data of the transmission target devices to the server device.

Further, a server device according to another exemplary embodiment of the present invention is a server device collecting data from a gateway device collecting the data from a plurality of devices. The server device includes: a communication means configured to receive, from the gateway device, the data of transmission target devices selected from among the plurality of devices; and an interpolation means configured to use the data of the transmission target devices to perform estimation, by interpolation, of values of the data of the devices having not been selected from among the plurality of devices.

Further, a computer program according to another exemplary embodiment of the present invention includes instructions for causing a computer collecting data from a plurality of devices and transmitting the data to a server device to function as: a thinning means configured to select a plurality of transmission target devices from among the plurality of devices; and a communication means configured to transmit the data of the transmission target devices to the server device.

Further, a computer program according to another exemplary embodiment of the present invention includes instructions for causing a computer collecting data from a gateway device collecting the data from a plurality of devices to function as: a communication means configured to receive, from the gateway device, the data of transmission target devices selected from among the plurality of devices; and an interpolation means configured to use the data of the transmission target devices to perform estimation, by interpolation, of values of the data of the devices having not been selected from among the plurality of devices.

With the configurations described above, the present invention can effectively reduce the amount of data transmitted from a gateway device to a server device via a network.

BRIEF DESCRIPTION OF DRAWINGS

FIGS. 8A, 8B and 8C are explanation views of an interpolation method used by an interpolation unit of the server device in the first exemplary embodiment of the present invention;

FIGS. 9A, 9B, 9C and 9D are operation explanation views of an interpolation possibility determination unit of the server device in the first exemplary embodiment of the present invention;

FIG. 15 is a view showing an example of a judgment formula used by a thinning rate deciding part in the fourth exemplary embodiment of the present invention;

EXEMPLARY EMBODIMENTS

Next, exemplary embodiments of the present invention will be described in detail with reference to the drawings.

First Exemplary Embodiment

Figure 1:
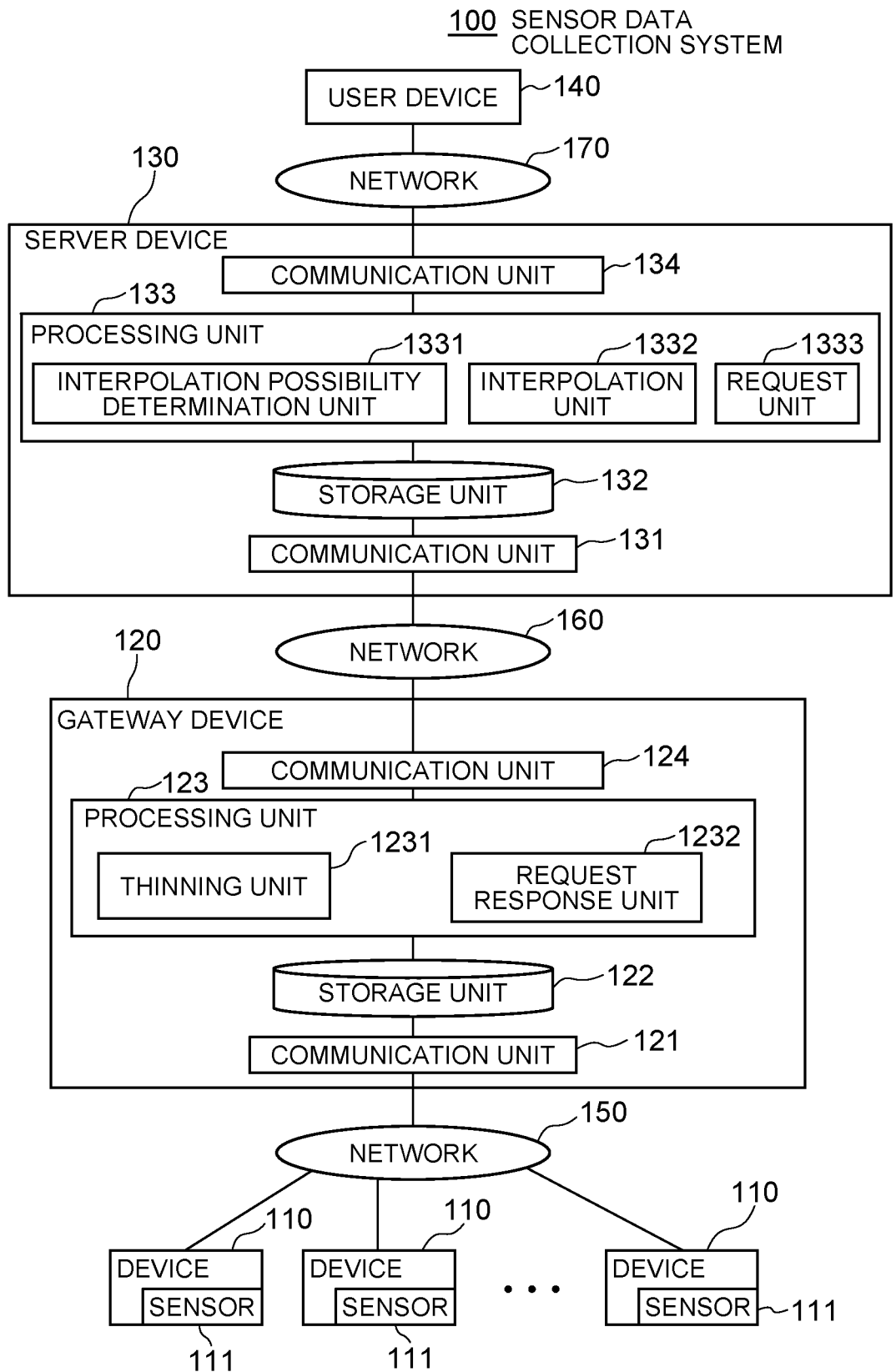
FIG. 1 is a block diagram of a sensor data collection system relating to a first exemplary embodiment of the present invention.

With reference to FIG. 1, a sensor data collection system 100 according to a first exemplary embodiment of the present invention includes a device 110, a gateway device 120, a server device 130, and a user device 140.

A plurality of devices 110 are included. The devices 110 are placed at geographically different positions at given granularity or in given density. Moreover, the devices 110 each have one or more sensors 111 of the same kind. The sensor 111 detects, for example, an event relating to weather, earthquake, air pollution or the like, and a phenomenon such as a temperature, humidity, wind speed, illumination, vibration and a population level. The devices 110 each have a function to temporally synchronize with the other and detect a phenomenon at regular intervals. Temporally synchronizing is detecting a phenomenon with the sensors 111, for example, at the same time. Moreover, the devices 110 each have a function to transmit data of a detection result, namely, sensor data to the gateway device 120 via a network 150. The network 150 is a network such as ZigBee™ and Bluetooth™.

The gateway device 120 is connected to the devices 110 via the network 150 and connected to the server device 130 via a network 160. The gateway device 120 has a function as a relay device that transmits sensor data detected by the sensors 111 collected from the devices 110 via the network 150 to the server device 130 via the network 160. The network 160 is a mobile network such as 3G and LTE.

The gateway device 120 has a communication unit 121, a storage unit 122, a processing unit 123, and a communication unit 124.

The communication unit 121 has a function to communicate with the devices 110 via the network 150. Moreover, the communication unit 121 has a function to store sensor data detected by the sensors 111 received from the devices 110 into the storage unit 122.

The storage unit 122 has a function to temporarily store sensor data collected from the devices 110. The storage unit 122 can be a random accessible storage device such as a RAM and a magnetic disk. Data stored in the storage unit 122 may be deleted from the storage unit 122 when transmission to the server device 130 has ended or when a certain period has passed in order to increase the free space.

The processing unit 123 is a unit to extract sensor data to be transmitted to the server device 130 from the storage unit 122 and transmit the sensor data to the communication unit 124. The processing unit 123 has a thinning unit 1231 and a request response unit 1232.

The thinning unit 1231 has a function to select a plurality of transmission target devices from among the plurality of devices 110 by thinning the plurality of devices 110. Moreover, the thinning unit 1231 has a function to extract sensor data relating to the selected transmission target devices from sensor data of the plurality of devices 110 stored in the storage unit 122 and transmit the extracted sensor data to the communication unit 124 in order to transmit to the server device 130.

The request response unit 1232 has a function to, when requested by the server device 130, extract sensor data of the devices 110 thinned by the thinning unit 1231 from the sensor data of the plurality of devices 110 stored in the storage unit 122 and transmit the extracted sensor data to the communication unit 124 in order to transmit to the server device 130.

The communication unit 124 has a function to communicate with the server device 130 via the network 160. Moreover, the communication unit 124 has a function to put sensor data transmitted from the processing unit 123 into a packet and transmit it to the server device 130 via the network 160.

Figure 2:
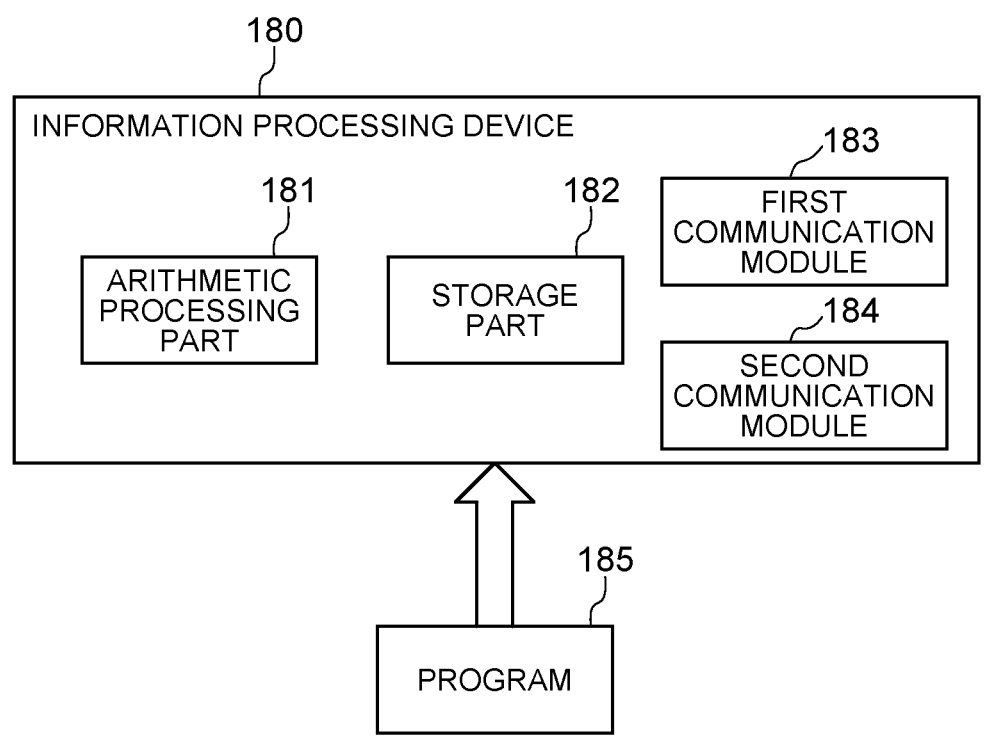
FIG. 2 is a block diagram of an information processing device that realizes a gateway device according to the first exemplary embodiment of the present invention.

The gateway device 120 can be realized by, for example, as shown in FIG. 2, an information processing device 180 including an arithmetic processing part 181 such as one or more microprocessors, a storage part 182 such as a memory and a hard disk, a first communication module 183 and a second communication module 184 and by a program 185. The first communication module 183 is used for communication with the devices 110, and the second communication module 184 is used for communication with the server device 130. For example, the first communication module 183 is a module that performs wireless communication by using a protocol such as Bluetooth™ and ZigBee™. Moreover, the second communication module 184 is a module for performing broadband wireless communication employed by a mobile phone network or a PHS network. The program 185 is loaded to the memory from an external computer-readable recording medium at the time of, for example, startup of the information processing device 180 and controls the operation of the arithmetic processing part 181, thereby realizing, on the arithmetic processing unit 181, functional units such as the communication unit 121, the storage unit 122, the processing unit 123 including the thinning unit 1231 and the request response unit 1232, and the communication unit 124.

With reference to FIG. 1 again, the server device 130 is connected to the gateway device 120 via the network 160 and connected to the user device 140 via a network 170. The server device 130 is also called a common platform. The network 170 is a network such as the Internet.

The server device 130 has a communication unit 131, a storage unit 132, a processing unit 133, and a communication unit 134.

The communication unit 131 has a function to communicate with the gateway device 120 via the network 160. Moreover, the communication unit 131 has a function to store sensor data of the sensor 111 received from the gateway device 120 into the storage unit 132.

The storage unit 132 has a function to temporarily store sensor data collected from the device 110 via the gateway device 120. The storage unit 132 may be a random accessible storage device such as a RAM and a magnetic disk. Data stored in the storage unit 132 may be deleted from the storage unit 132 when transmission to the user device 140 has ended or when a certain period has passed in order to increase the free space.

The processing unit 133 includes an interpolation possibility determination unit 1331, an interpolation unit 1332 and a request unit 1333, as functional parts relating to collection of sensor data.

The interpolation possibility determination unit 1331 has a function to determine a possibility of interpolation by the interpolation unit 1332. The interpolation possibility determination unit 1331 determines a possibility of interpolation of sensor data thinned by the gateway device 120 on the basis of a history of sensor data received from the gateway device 120, namely, sensor data transmitted without thinned by the gateway device 120. Moreover, the interpolation possibility determination unit 1331 has a function to start the interpolation unit 1332 when a possibility of interpolation is present and, on the other hand, start the request unit 1333 when a possibility of interpolation is not present.

The interpolation unit 1332 has a function to, by using sensor data received from the gateway device 120 stored in the storage unit 132, estimate, by interpolation, a value of sensor data of the device 110 thinned in the gateway device 120, namely, a value of sensor data having not been transmitted from the gateway device 120. Moreover, the interpolation unit 1332 has a function to store the value of sensor data estimated by interpolation into the storage unit 132.

The request unit 1333 has a function to transmit a message that is a request for sensor data of the thinned devices 110 to the gateway device 120 via the communication unit 131. Moreover, the request unit 1333 has a function to, upon receipt of the sensor data of the thinned devices 110 from the gateway device 120 in response to the request, store the sensor data into the storage unit 132.

Further, the processing unit 133 has a function to, for example, in accordance with a search request received from the user device 140 via the network 170, search the storage unit 132 and return the result of the search to the request source user device 140. Moreover, the processing unit 133 may have a function to, without the search request, autonomously transmit sensor data accumulated in the storage unit 132 to the user device 140 via the network 170.

The communication unit 134 has a function to communicate with the user device 140 via the network 170. Moreover, the communication unit 134 has a function to put sensor data transmitted from the processing unit 133 into a packet and transmit it to the user device 140 via the network 170.

Figure 3:
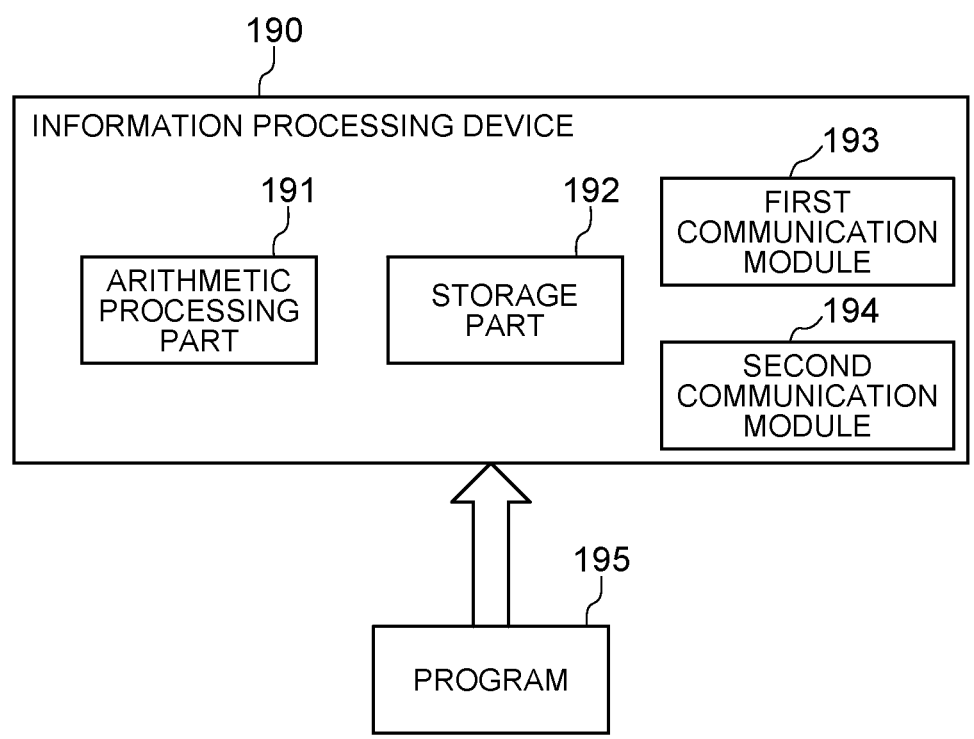
FIG. 3 is a block diagram of an information processing device that realizes a server device according to the first exemplary embodiment of the present invention.

The server device 130 can be realized by, for example, as shown in FIG. 3, an information processing device 190 including an arithmetic processing part 191 such as one or more microprocessors, a storage part 192 such as a memory and a hard disk, a first communication module 193 and a second communication module 194 and by a program 195. The first communication module 193 is used for communication with the gateway device 120, and the second communication module 194 is used for communication with the user device 140. For example, the first communication module 193 is a module that performs broadband wireless communication employed by, for example, a mobile phone network or a PHS network. Moreover, the second communication module 194 is, for example, a communication module for a wireless LAN or a wired LAN. The program 195 is loaded to the memory from an external computer-readable recording medium at the time of, for example, startup of the information processing device 190 and controls the operation of the arithmetic processing part 191, thereby realizing, on the arithmetic processing unit 191, functional units such as the communication unit 131, the storage unit 132, the processing unit 133 including the interpolation possibility determination unit 1331 and the interpolation unit 1332, and the communication unit 134.

The user device 140 is a computer such as a personal computer used by the user of the sensor data collection system.

Figure 4:
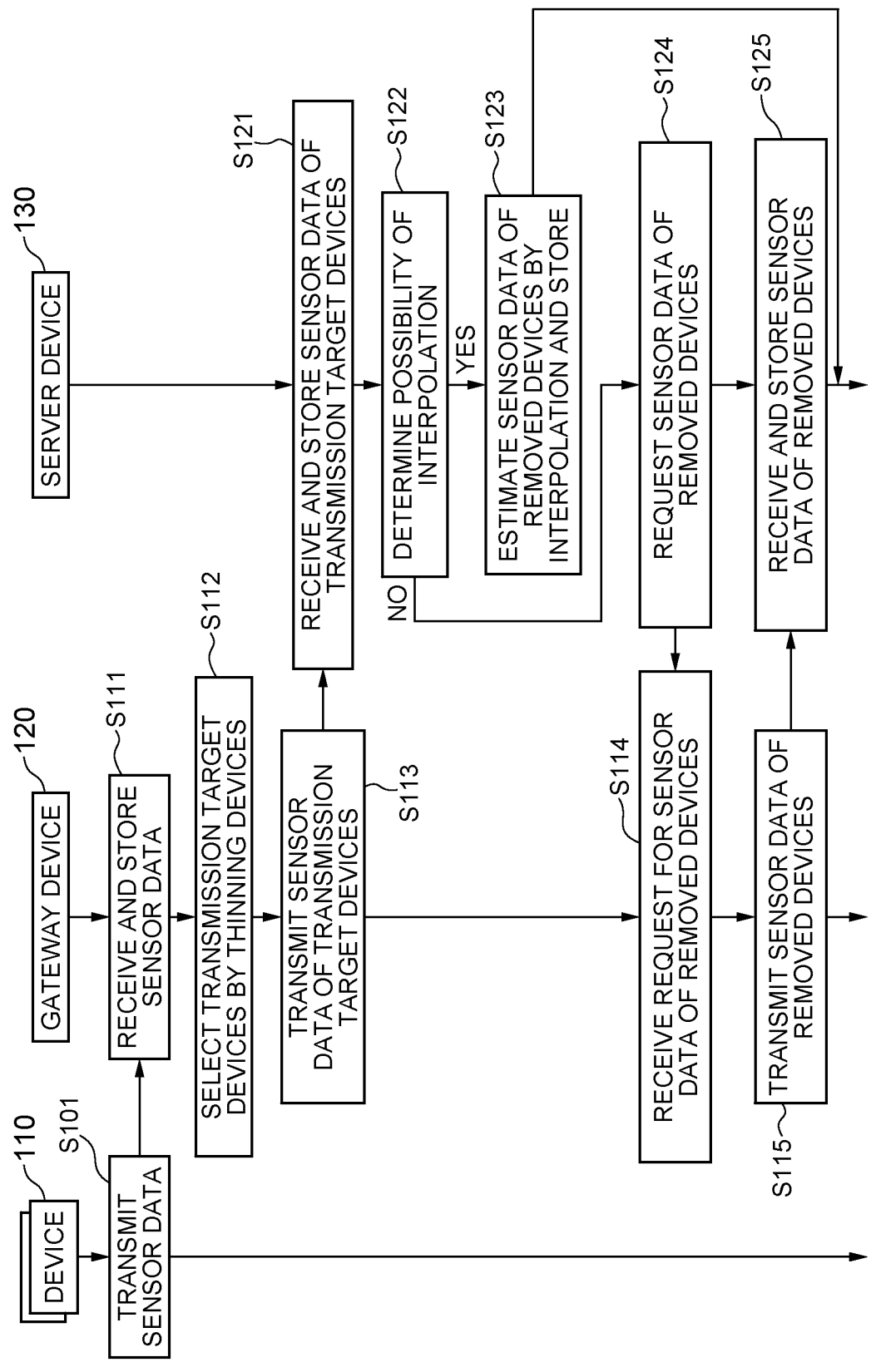
FIG. 4 is view showing an example of an operation sequence of the sensor data collection system according to the first exemplary embodiment of the present invention.

FIG. 4 is a view showing an example of an operation sequence of the sensor data collection system 100. Below, with reference to FIG. 4, an operation of the sensor data collection system 100 will be described.

The devices 110 temporally synchronize with each other to each detect a phenomenon such as a temperature with the sensor 111 and transmit sensor data including a detected value to the gateway device 120 via the network 150 (step S101). Such detection with the sensor 111 and transmission to the gateway device 120 by the device 110 are repeatedly executed at regular intervals. Otherwise, such detection and transmission by the sensor 111 of the device 110 may be executed when requested by the gateway device 120.

Figure 5:
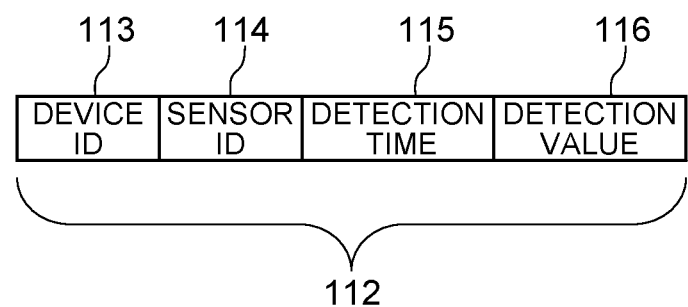
FIG. 5 is a view showing an example of a format of sensor data in the gateway device according to the first exemplary embodiment of the present invention.

FIG. 5 shows an example of a format of sensor data transmitted from the device 110 to the gateway device 120. Sensor data 112 in this example includes a device ID 113, a sensor ID 114, detection time 115, and a detection value 116. The device ID 113 is a number or the like for identifying the device 110. The sensor ID 114 is a number or the like for identifying the sensor 111. The detection time 115 is time of detection by the sensor 111. The detection value 116 is a value such as a temperature detected by the sensor 111.

The communication unit 121 of the gateway device 120 receives the sensor data from the device 110 via the network 150 and stores into the storage unit 122 (step S111).

The thinning unit 1231 of the gateway device 120 thins the plurality of devices 110, thereby selecting a plurality of transmission target devices from the plurality of devices 110 (step S112). Next, the thinning unit 1231 extracts sensor data relating to the selected transmission target devices from the sensor data of the plurality of devices 110 stored in the storage unit 122, and transmits the extracted sensor data to the server device 130 via the communication unit 124 (step S113).

The communication unit 131 of the server device 130 receives the sensor data of the transmission target devices from the gateway device 120 via the network 160 and stores the sensor data into the storage unit 132 (step S121). Next, the interpolation possibility determination unit 1331 of the server device 130 determines a possibility of interpolation of sensor data of the devices 110 removed in the gateway device 120, on the basis of a history of the sensor data of the transmission target devices stored in the storage unit 132 (step S122). Then, in a case where a possibility of interpolation is present, the interpolation possibility determination unit 1331 starts the interpolation unit 1332 and does not start the request unit 1333. On the other hand, in a case where a possibility of interpolation is not present, the interpolation possibility determination unit 1331 starts the request unit 1333 and does not start the interpolation unit 1332.

Upon started, the interpolation unit 1332 uses the sensor data of the transmission target devices stored in the storage unit 132 to estimate, by interpolation, a value of the sensor data of the devices 110 removed in the gateway device 120 and stores the estimated sensor data into the storage unit 132 (step S123).

On the other hand, upon started, the request unit 1333 transmits a message to request the sensor data of the removed devices 110 to the gateway device 120 via the communication unit 131 (step S124). Upon receipt of the request message via the communication unit 124 (step S114), the request response unit 1232 of the gateway device 120 extracts the sensor data of the removed devices 110 from the storage unit 122 and transmits the extracted sensor data to the server device 130 via the communication unit 124 (step S115). The request unit 1333 of the server device 130 receives the sensor data of the removed devices 110 and stores the sensor data into the storage unit 132 (step S125).

Although not shown in FIG. 4, the server device 130 transmits the sensor data accumulated in the storage unit 132 to the user device 140 via the network 170 in response to a request from the user device 140 or autonomously. The user device 140 displays the data received from the server device 130 on a display device or inputs into an application program to execute given processing such as statistical processing.

Next, with a specific example, a configuration and operation of the sensor data collection system 100 according to this exemplary embodiment will be more specifically described focusing on the thinning unit 1231 of the gateway device 120 and the interpolation possibility determination unit 1331 and the interpolation unit 1332 of the server device 130.

Figure 6:
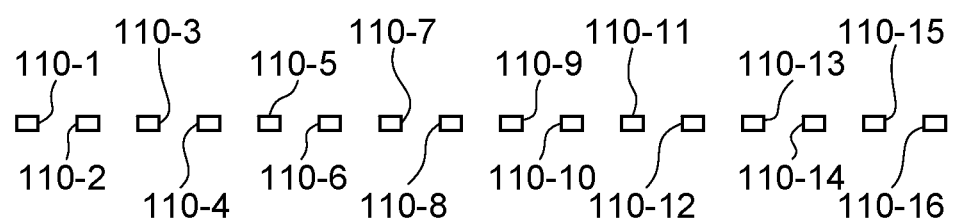
FIG. 6 is a view showing an example of arrangement of a plurality of devices in the first exemplary embodiment of the present invention.

FIG. 6 shows an example of arrangement of the plurality of devices 110. In the example shown in FIG. 6, sixteen devices 110-1 to 110-16 are arranged in a line at given intervals in ascending order of the device IDs 113. Herein, the device IDs of the devices 110-1 to 110-16 are 1 to 16. Although there are sixteen devices 110 in total in FIG. 6, the number of the devices 110 is not limited to 16, and the number may be less than 16 or may be more than 16. Moreover, the devices 110 each have a single sensor 111, and the kind of the sensors 111 is the same. However, the devices 110 may each have two or more sensors 111 of the same kind.

Figure 7A:
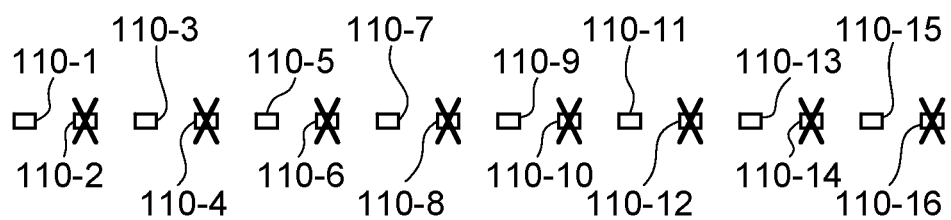
FIGS. 7A and 7B are views showing an example of thinning the plurality of devices in the first exemplary embodiment of the present invention.
Figure 7B:
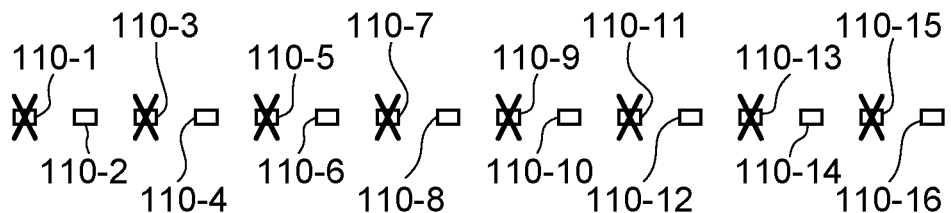

FIGS. 7A and 7B are explanation views of a thinning method used by the thinning unit 1231 of the gateway device 120. FIG. 7A shows a method of leaving the odd-numbered devices 110 and removing the even-numbered devices 110. Moreover, Fig. B shows a method of, contrary to the above, leaving the even-numbered devices 110 and removing the odd-numbered devices 110. The thinning unit 1231 uses the thinning method shown in FIG. 7A and the thinning method shown in FIG. 7B alternately. That is, the plurality of devices 110, for example, synchronously execute sensing by the sensors 111 at time T1, synchronously execute sensing by the sensors 111 again at time T2 that is a next period, and synchronously execute sensing by the sensors 111 again at time T3 that is a further next period. In this case, sixteen sensor data 112 having the same detection time T1, sixteen sensor data 112 having the same detection time T2, and sixteen sensor data 112 having the same detection time T3 are stored into the storage unit 122. Then, the thinning unit 1231, for example, thins the sixteen sensor data 112 having the detection time T1 by the method of FIG. 7A, thins the sixteen sensor data 112 having the detection time T2 by the method of FIG. 7B, and thins the sixteen sensor data 112 having the detection time T3 by the method of FIG. 7A again.

Figure 8C:
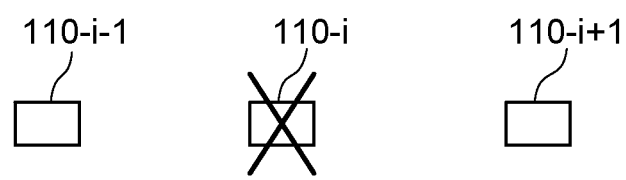

FIGS. 8A, 8B and 8C are explanation views of an interpolation method used by the interpolation unit 1332 of the server device 130. On the basis of an assumption that sensor data of devices located close to each other are highly relevant, the interpolation unit 1332 uses spatial interpolation to estimate sensor data of a removed device from sensor data of a neighboring device. FIG. 8A shows an example of a formula for estimating a value Z(x) of sensor data of a removed device. This formula is a formula for estimating the value Z(x) of sensor data of a device located at a certain position x by using a value $Z_i$ of sensor data of a device located at a neighboring position i (i=1, ..., n), which is an estimation formula by inverse distance weighting. In the formula shown in FIG. 8A, $W_i$ denotes a weight on $Z_i$ and is given by, for example, a formula shown in FIG. 8B by using a distance $d_i$ between the position x and the position i.

For example, assuming n is 2 and the distances between the neighboring devices 110 are uniform, a value of sensor data of a removed device 110-i shown in FIG. 8C is obtained as an average value of sensor data of two neighboring devices 110-i−1 and 110-i+1.

Next, a specific example of the interpolation possibility determination unit 1331 of the server device 130 will be described.

As mentioned above, the interpolation unit 1332 stands on the assumption that sensor data of devices located close to each other are highly relevant. That is, it is possible to estimate a value of sensor data of the device 110-i from values of sensor data of the two neighboring devices 110-i−1 and 110-i+1, for example, as shown in FIG. 8C, because sensor data of the three devices close to each other are highly relevant. Herein, being highly relevant is behaving in a similar manner to each other. Therefore, for example, as shown in FIG. 9A, when a current value of sensor data of the device 110-i−1 is more than its previous value, a current value of sensor data of the device 110-i+1 is also more than its previous value, and the increase amounts of the both must be similar.

Therefore, in a case where, for example, as shown in FIG. 9B, a current value of sensor data of one of the devices 110-i−1 and 110-i+1 has largely increased from its previous value and, to the contrary, a current value of sensor data of the other device has largely decreased from its previous value, it can be said that the current value of the device 110-i−1 and the current value of the device 110-i+1 are not highly relevant. It is wrong to, though the device 110-i−1 and the device 110-i+1 are not highly relevant, think that the device 110-i−1 and the device 110-i are highly relevant and the device 110-i the device 110-i+1 are highly relevant. That is, it can be said that a possibility of interpolation is not present in such a case.

The same can be said in a case where, for example, as shown in FIG. 9C, a current value of sensor data of one of the devices 110-i−1 and 110-i+1 has largely changed from its previous value, but a current value of sensor data of the other device has not changed much from its previous value.

FIG. 9D shows an example of an interpolation possibility determination formula used by the interpolation possibility determination unit 1331. The interpolation possibility determination formula of this example shows that a possibility of interpolation is present if a variance value of an increase/decrease amount $\Delta Z_i$ of the device 110 having not been removed is smaller than a predetermined threshold α, and a possibility of interpolation is not present if not. The increase/decrease amount $\Delta Z_i$ of a device is a value obtained by subtracting a current value of sensor data of a device having not been removed from a previous value of the sensor data. Otherwise, the increase/decrease amount $\Delta Z_i$ of a device may be a value obtained by subtracting a current value of sensor data of a device having not been removed from an average value of values of the sensor data of the most recent M times (M=2, 3, ..., L). Moreover, a change rate may be used instead of the increase/decrease amount $\Delta Z_i$. Moreover, a possibility of interpolation may be determined by comparing not a variance value of the increase/decrease amount $\Delta Z_i$ of all the devices 110 having not been removed but a variance value of the increase/decrease amount $\Delta Z_i$ of some of them with a threshold. Moreover, by comparing a variance value of a plurality of neighboring devices used for interpolation with a threshold, a possibility of interpolation may be determined for each device for which it is desired to obtain a value by interpolation.

Meanwhile, the interpolation possibility judgment formula used by the interpolation possibility determination unit 1331 is not limited to that shown in FIG. 9D. For example, explaining by using as an example a method of leaving the odd-numbered devices 110 and removing the even-numbered devices 110 as shown in FIG. 7A, a method as described below may be used. First, a correlation coefficient of two data groups is calculated. The two data groups are: a previous value group including previous sensor data values of all the odd-numbered devices 110; and a current value group including current sensor data values of all the even-numbered devices 110. This correlation coefficient takes a numerical value from −1 to +1, where −1 indicates a positive correlation, +1 indicates a negative correlation, and 0 indicates no correlation. Next, the calculated correlation coefficient is compared with a threshold SH and, in a case where the correlation coefficient is equal to or more than the threshold SH, there is a high correlation, so that it is determined that a possibility of interpolation is present. On the other hand, in a case where the correlation coefficient is less than the threshold SH, it is determined that a possibility of interpolation is not present. The threshold SH can be a value of 0.5 or more, for example.

Thus, according to this exemplary embodiment, the following effects can be obtained.

It is possible to effectively reduce the amount of data transmitted from the gateway device 120 to the server device 130 via the network 160. This is because the gateway device 120 thins the plurality of devices 110 to select a plurality of transmission target devices and transmits sensor data of the selected devices 110 to the server device 130 via the network 160.

Further, the server device 130 can refer to approximate values of sensor data of the removed devices 110. This is because the server device 130 uses values of the sensor data of the transmission target devices received from the gateway device 120 to estimate values of sensor data of the removed devices 110 by interpolation.

Further, the server device 130 can, with respect to each device 110, see a right sensor data value once in two times. This is because the thinning unit 1231 alternately selects one of the two thinning methods in which devices to be removed are different from each other.

Further, the server device 130 does not see sensor data with large error. This is because the server device 130 determines a possibility of interpolation on the basis of a history of the sensor data of the transmission target devices and, when a possibility of interpolation is not present, requests and acquires removed sensor data from the gateway device 120.

Second Exemplary Embodiment

Figure 10:
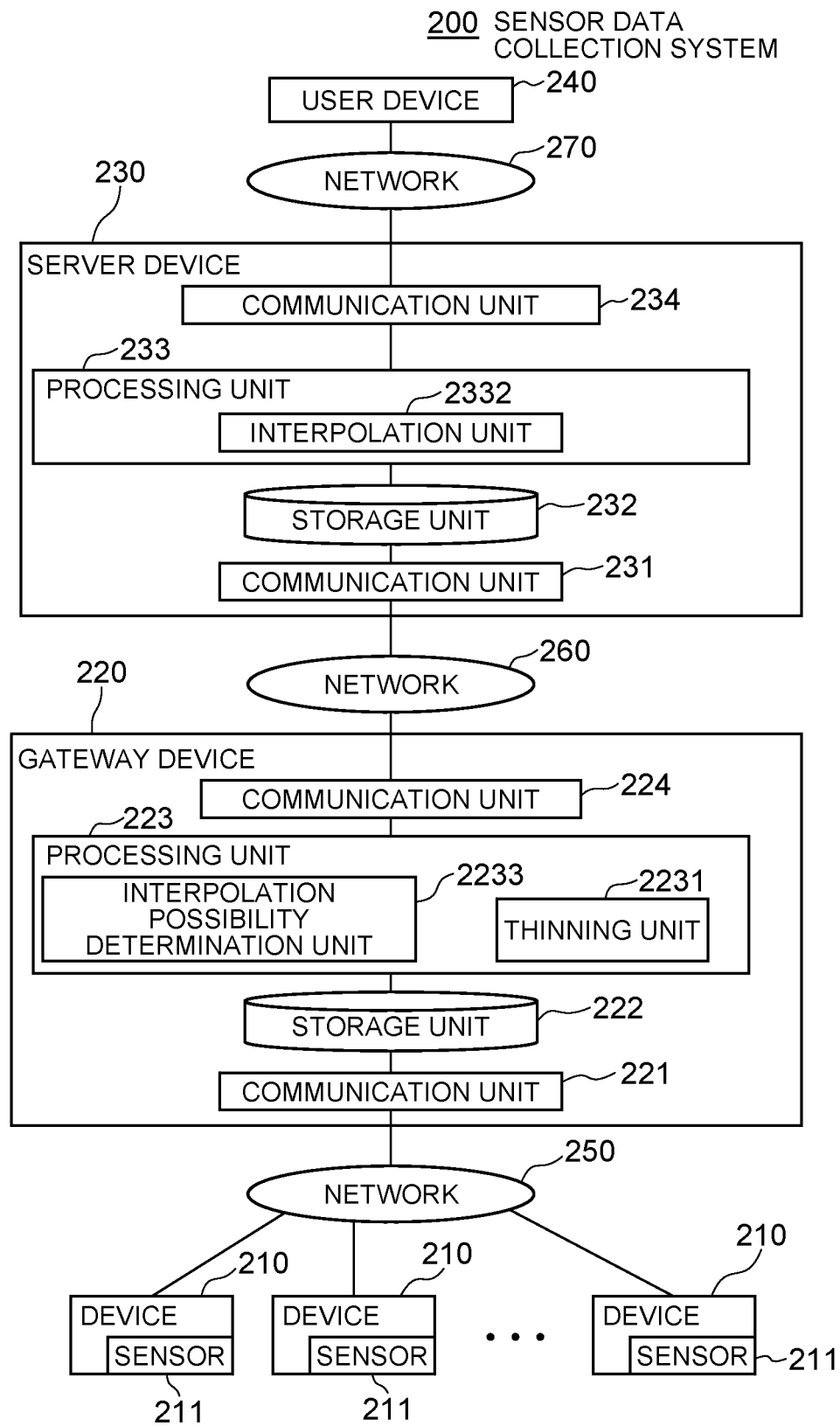
FIG. 10 is a block diagram of a sensor data collection system according to a second exemplary embodiment of the present invention.

With reference to FIG. 10, a sensor data collection system 200 according to a second exemplary embodiment of the present invention includes a device 210 having a sensor 211, a gateway device 220, a server device 230, and a user device 240. The device 210 and the gateway device 220 are connected via a network 250, the gateway device 220 and the server device 230 are connected via a network 260, and the server device 230 and the user device 240 are connected via a network 270. Among them, the device 210, the sensor 211, the user device 240, and the networks 250, 260 and 270 have the same functions as the device 110, the sensor 111, the user device 140, and the networks 150, 160 and 170 shown in FIG. 1.

The gateway device 220 is connected to the device 210 via the network 250, and is connected to the server device 230 via the network 260. The gateway device 220 has a function as a relay device that transmits sensor data detected by the sensor 211 collected from the device 210 via the network 250, to the server device 230 via the network 260.

The gateway device 220 has a communication unit 221, a storage unit 222, a processing unit 223, and a communication unit 224. Among them, the communication unit 221, the storage unit 222 and the communication unit 224 have the same functions as the communication unit 121, the storage unit 122 and the communication unit 124 shown in FIG. 1.

The processing unit 223 is a unit that extracts sensor data to be transmitted to the server device 230 from the storage unit 222 and transmits the extracted sensor data to the communication unit 224. The processing unit 223 includes a thinning unit 2231 and an interpolation possibility determination unit 2233. The thinning unit 2231 has the same function as the thinning unit 1231 shown in FIG. 1.

The interpolation possibility determination unit 2233 has a function to determine a possibility of interpolation by an interpolation unit 2332 to be described later. The interpolation possibility determination unit 2233 determines a possibility of interpolation of sensor data removed in the gateway device 220 on the basis of a history of sensor data transmitted to the server device 230, that is, sensor data transmitted without being removed in the gateway device 220. Moreover, the interpolation possibility determination unit 2233 has a function to control the thinning unit 2231 on the basis of the possibility of interpolation. To be specific, the interpolation possibility determination unit 2233 starts the thinning unit 2231 when a possibility of interpolation is present. On the other hand, when a possibility of interpolation is not present, the interpolation possibility determination unit 2233 does not start the thinning unit 2231, and extracts sensor data from the storage unit 222 without thinning and conveys the extracted sensor data to the communication unit 224 in order to transmit to the server device 230.

The gateway device 220 as described above can be realized by the information processing device 180 and the program 185 described with reference to FIG. 2, for example. The program 185 is loaded from an external computer-readable recording medium to the memory, for example, at the time of startup of the information processing device 180 and controls the operation of the arithmetic processing part 181, thereby realizing, on the arithmetic processing part 181, functional units such as the communication unit 221, the storage unit 222, the processing unit 223 including the thinning unit 2231 and the interpolation possibility determination unit 2233, and the communication unit 224.

With reference to FIG. 10 again, the server device 230 is connected to the gateway device 220 via the network 260, and is connected to the user device 240 via the network 270. The server device 230 is also referred to as a common platform.

The server device 230 has a communication unit 231, a storage unit 232, a processing unit 233, and a processing unit 234. Among them, the communication unit 231, the storage unit 232 and the communication unit 234 have the same functions as the communication unit 131, the storage unit 132 and the communication unit 134 shown in FIG. 1.

The processing unit 233 includes an interpolation unit 2332 as a function part relating to collection of sensor data. The interpolation unit 2332 has the same function as the interpolation unit 1332 shown in FIG. 1.

Further, the processing unit 233 has a function to, for example, in accordance with a search request received from the user device 240 via the network 270, search the storage unit 232 and return a search result to the request source user device 240. Moreover, the processing unit 233 may have a function to, without the search request, autonomously transmit sensor data accumulated in the storage unit 232 to the user device 240 via the network 270.

The server device 230 as described above can be realized by the information processing device 190 and the program 195 described with reference to FIG. 3, for example. The program 195 is loaded from an external computer-readable recording medium to the memory, for example, at the time of startup of the information processing device 190 and controls the operation of the arithmetic processing part 191, thereby realizing, on the arithmetic processing part 191, functional units such as the communication unit 231, the storage unit 232, the processing unit 233 having the interpolation unit 2332, and the communication unit 234.

Figure 11:
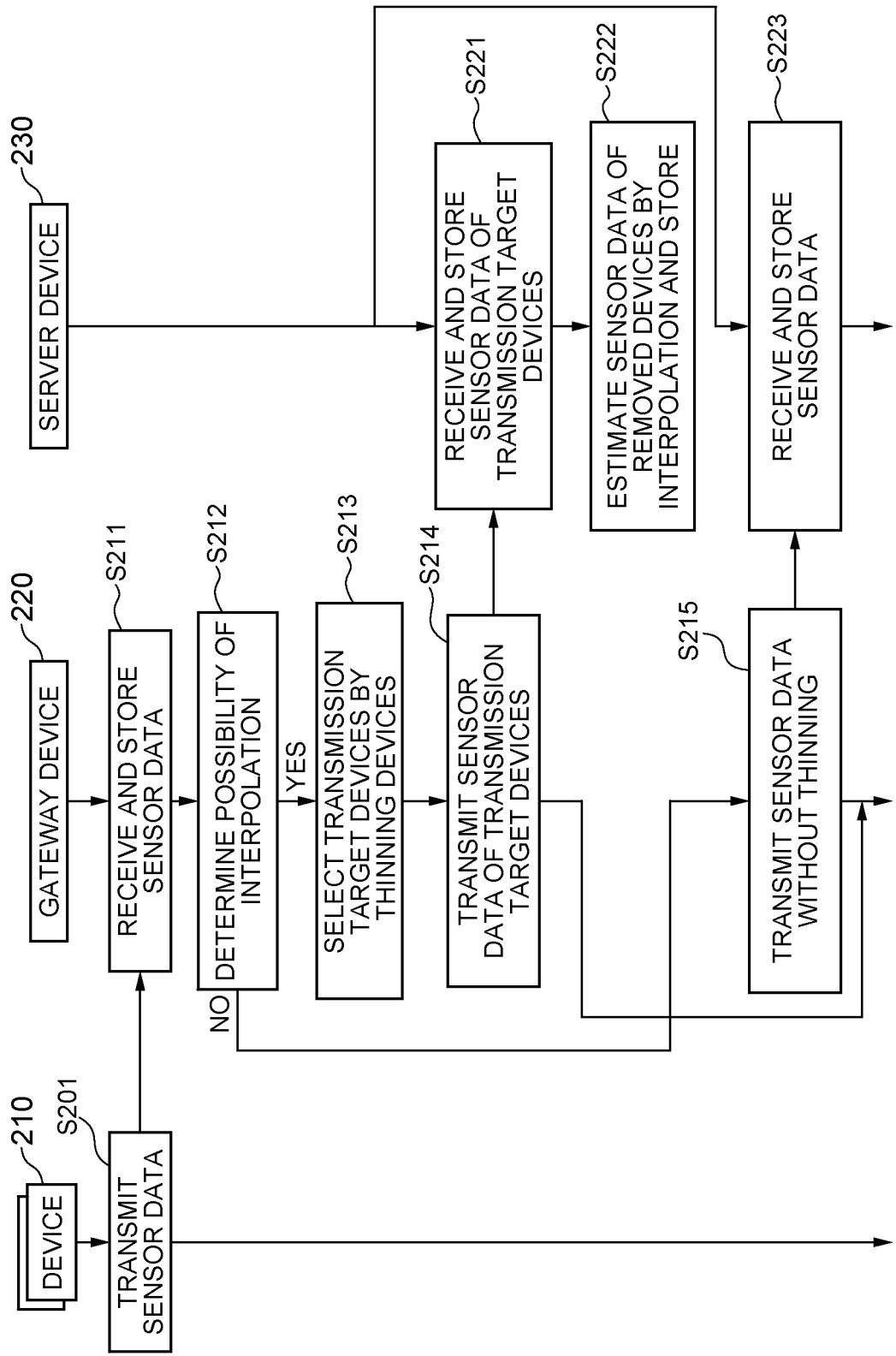
FIG. 11 is a view showing an example of an operation sequence of the sensor data collection system according to the second exemplary embodiment of the present invention.

FIG. 11 is a view showing an example of an operation sequence of the sensor data collection system 200. Below, with reference to FIG. 11, an operation of the sensor data collection system 200 will be described.

The devices 210 temporally synchronize with each other to each detect a phenomenon such as a temperature with the sensor 211 and transmit sensor data with a format including a detected value, for example, as shown in FIG. 5 to the gateway device 220 via the network 250 (step S201). Such detection with the sensor 211 and transmission to the gateway device 220 by the device 210 is repeatedly executed at regular intervals. Otherwise, such detection with the sensor 211 and transmission by the device 210 may be executed when a request is made by the gateway device 220.

The communication unit 221 of the gateway device 220 receives the sensor data from the device 210 via the network 250 and stores the sensor data into the storage unit 222 (step S211).

The interpolation possibility determination unit 2233 of the gateway device 220 determines a possibility of interpolation by the interpolation unit 2332 (step S212). To be specific, the interpolation possibility determination unit 2233 determines a possibility of interpolation by the interpolation unit 2332 of thinned sensor data on the basis of a history of sensor data transmitted to the server device 230 without being thinned in the case of starting the thinning unit 2231. Then, in a case where determining that a possibility of interpolation is present, the interpolation possibility determination unit 2233 starts the thinning unit 2231. On the other hand, in a case where a possibility of interpolation is not present, the interpolation possibility determination unit 2233 does not start the thinning unit 2231.

The thinning unit 2231, when started, thins the plurality of devices 210, thereby selecting a plurality of transmission target devices from the plurality of devices 210 (step S213). Next, the thinning unit 2231 extracts sensor data relating to the selected transmission target devices from the sensor data of the plurality of devices 210 stored in the storage unit 222, and transmits the extracted sensor data to the server device 230 via the communication unit 224 (step S214).

The communication unit 231 of the server device 230 receives the sensor data of the transmission target devices from the gateway device 220 via the network 260, and stores the sensor data into the storage unit 232 (step S221). Next, the interpolation unit 2332 of the server device 230 uses the sensor data of the transmission target devices stored in the storage unit 232 to estimate, by interpolation, a value of sensor data of the devices 210 removed in the gateway device 220, and stores the estimated sensor data into the storage unit 232 (step S222).

On the other hand, in the case of determining that a possibility of interpolation is not present, the interpolation possibility determination unit 2233 of the gateway device 220 extracts the sensor data from the storage unit 222 without thinning, and transmits the extracted sensor data to the server device 230 via the communication unit 224 (step S215). The communication unit 231 of the server device 230 receives the sensor data from the gateway device 220 via the network 260, and stores the sensor data into the storage unit 232 (step S223).

Although not shown in FIG. 11, the server device 230 transmits the sensor data accumulated in the storage unit 232 to the user device 240 via the network 270 in response to a request from the user device 240 or autonomously. The user device 240 displays the data received from the server device 230 on a display device or inputs the data into an application program to execute given processing such as statistical processing.

Thus, according to this exemplary embodiment, the following effects can be obtained.

It is possible to effectively reduce the amount of data transmitted from the gateway device 220 to the server device 230 via the network 260. This is because the gateway device 220 thins the plurality of devices 210 to select a plurality of transmission target devices and transmits sensor data of the selected devices 210 to the server device 230 via the network 260.

Further, the server device 230 can see approximate values of sensor data of the removed devices 210. This is because the server device 230 uses values of the sensor data of the transmission target devices received from the gateway device 220 to estimate, by interpolation, values of sensor data of the removed devices 110.

Further, the server device 230 can, with respect to each device 210, see a right sensor data value once in two times. This is because the thinning unit 2231 alternately selects one of the two thinning methods in which devices to be removed are different from each other.

Further, the server device 230 does not see sensor data with large error. This is because the gateway device 220 determines a possibility of interpolation on the basis of a history of the sensor data of the transmission target devices and, when a possibility of interpolation is not present, does not thin the sensor data and transmits from the gateway device 220 to the server device 230.

Third Exemplary Embodiment

This exemplary embodiment further devises a thinning unit mainly.

In the first and second exemplary embodiments, the thinning unit selects alternately from the two kinds of thinning methods as shown in FIGS. 7A and 7B, that is, the method of leaving the odd-numbered devices and removing the even-numbered devices and the method of leaving the even-numbered devices and removing the odd-numbered devices. Meanwhile, in this exemplary embodiment, various thinning methods as described below are used. A thinning unit used in this exemplary embodiment is used as the thinning unit 1231 shown in FIG. 1 or the thinning unit 2231 shown in FIG. 10.

The thinning unit used in this exemplary embodiment is configured to use, for example, either the thinning method shown in FIG. 7A or the thinning method shown in 7B at all times.

Figure 12A:
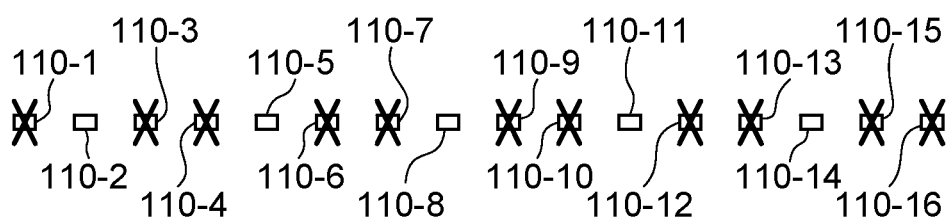
FIGS. 12A, 12B and 12C are views showing an example of thinning a plurality of devices in a third exemplary embodiment of the present invention.
Figure 12B:
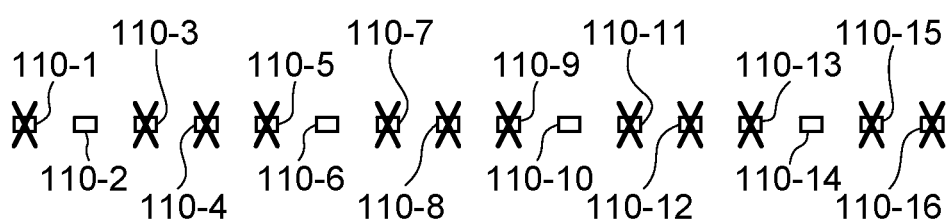
Figure 12C:
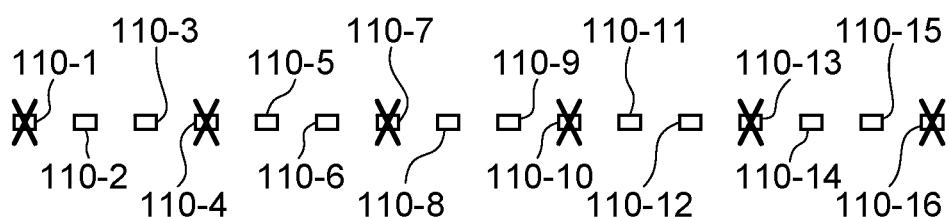

Otherwise, the thinning unit used in this exemplary embodiment uses, instead of the thinning method with the thinning rate of 50% shown in FIG. 7A or 7B, a thinning method with a thinning rate of 66% that is a method of, for each group composed of three adjacent devices, leaving one of the devices and removing the remaining two devices as shown in FIG. 12A, for example. Otherwise, the thinning unit used in this exemplary embodiment uses a thinning method with a thinning rate of 75% that is a method of, for each group composed of four adjacent devices, leaving one of the devices and removing the remaining three devices as shown in 12B, for example. Otherwise, the thinning unit used in this exemplary embodiment uses a thinning method with a thinning rate of 33% that is a method of, for each group composed of three adjacent devices, leaving two of the devices and removing the remaining one device as shown in 12C, for example. The abovementioned thinning rates are examples, and the thinning unit used in this exemplary embodiment may be configured to use a thinning method with a thinning rate other than the abovementioned ones.

Otherwise, the thinning unit used in this exemplary embodiment does not use a thinning method with a fixed thinning pattern as shown in FIGS. 7A, 7B, 12A, 12B and 12C, but uses a thinning method of thinning a plurality of devices at random. For example, the thinning unit used in this exemplary embodiment uses a thinning method with a thinning rate of 66% that is a method of, for each group composed of three adjacent devices, deciding one device to leave at random and removing the remaining two devices other than the decided one device. Otherwise, the thinning unit used in this exemplary embodiment uses a thinning method with a thinning rate of 50% that is a method of deciding eight devices to leave at random from among the sixteen devices shown in FIG. 6 and removing the remaining eight devices other than the decided eight devices. The abovementioned thinning rates are examples, and the thinning rate used in this exemplary embodiment may be configured to use a thinning method with a thinning rate other than the abovementioned ones.

Fourth Exemplary Embodiment

This exemplary embodiment further devises a thinning unit mainly.

A thinning unit used in this exemplary embodiment has a function to change a thinning rate with a given event. As an example of a given event, the following can be thought:
(1) change of load on a network between a gateway device and a server device; and
(2) change of a possibility of interpolation.

Figure 13:
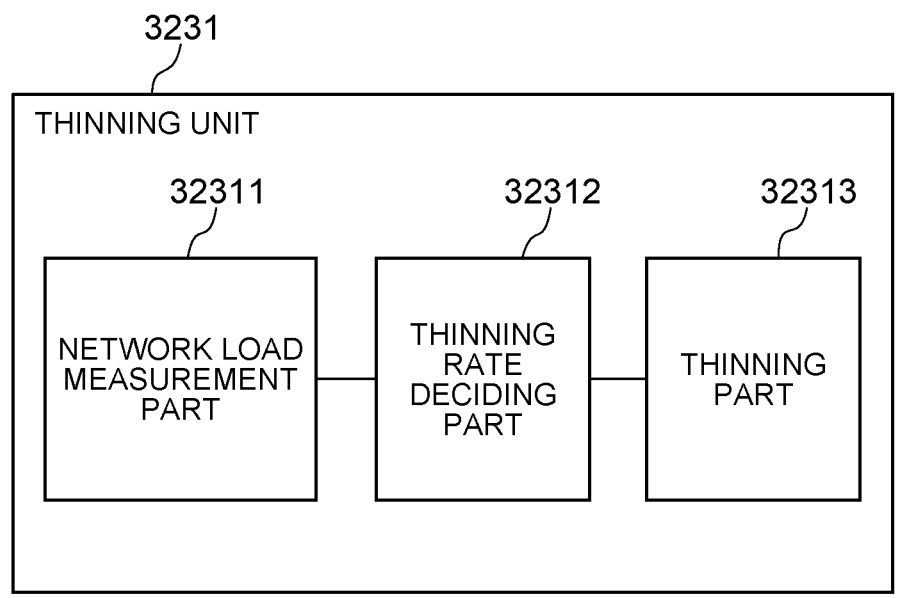
FIG. 13 is a block diagram of a thinning unit having a function to dynamically change a thinning rate in accordance with a load on a network in a fourth exemplary embodiment of the present invention.

FIG. 13 is a block diagram of a thinning unit 3231 having a function to dynamically change a thinning rate in accordance with a load on the network. As the thinning unit 3231, the thinning unit 1231 shown in FIG. 1 or the thinning unit 2231 shown in FIG. 10 is used.

The thinning unit 3231 has a network load measurement part 32311, a thinning rate deciding part 32312, and a thinning part 32313.

The network load measurement part 32311 has a function to measure a load on the network between the gateway device and the server device at regular intervals. The network load measurement part 32311 outputs a measurement result to the thinning rate deciding part 32312. A measurement result is, for example, a network bandwidth.

The thinning rate deciding part 32312 has a function to compare the measurement result with a threshold and decide a thinning rate. For example, if the measured network bandwidth is smaller than the threshold, the thinning rate deciding part 32312 determines that the network is busy and outputs a lower thinning rate than a thinning rate used when the network is not busy to the thinning part 32313. If the measured network bandwidth is equal to or more than the threshold, the thinning rate deciding part 32312 outputs the thinning rate used when the network is not busy to the thinning part 32313. Although the thinning rate deciding part 32312 uses one threshold herein, it may be configured to compare the network bandwidth with two or more thresholds and decide one thinning rate from among three or more thinning rates.

The thinning part 32313 has a function to thin the plurality of devices at the decided thinning rate to select a plurality of transmission target devices from among the plurality of devices. Moreover, the thinning part 32313 has a function to extract sensor data relating to the selected transmission target devices from the sensor data of the plurality of devices stored in the storage unit and transmit the extracted sensor data to the server device via the communication unit.

The network load measurement part 32311 and the thinning rate deciding part 32312 may be placed outside the thinning unit 3231. For example, the network load measurement part 32311 and the thinning rate deciding part 32312 may be placed at the server device. In this case, a thinning rate decided at the server device is notified to the thinning unit 3231 at the gateway device via the network.

Figure 14:
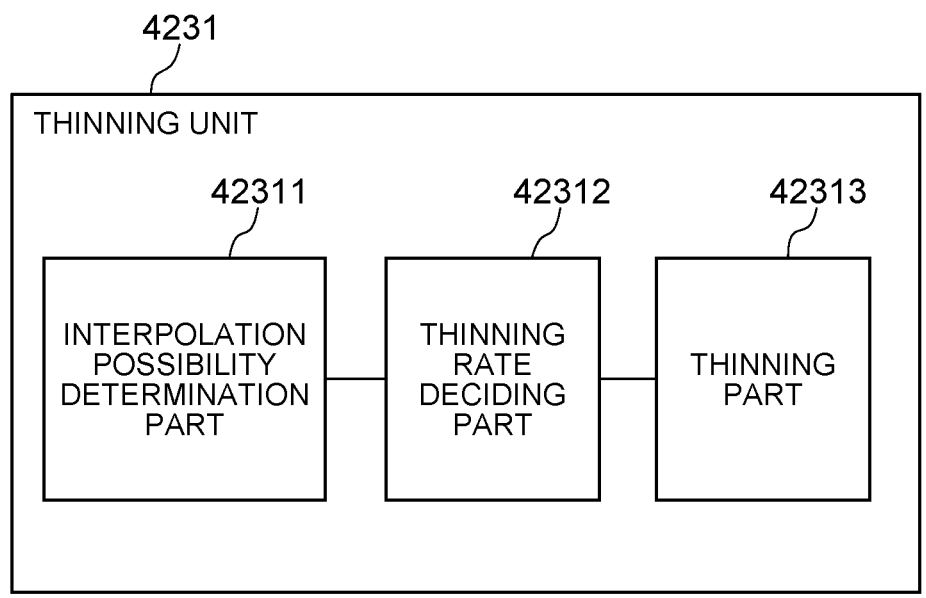
FIG. 14 is a block diagram of a thinning unit having a function to dynamically change a thinning rate in accordance with a possibility of interpolation in the fourth exemplary embodiment of the present invention.

FIG. 14 is a block diagram of a thinning unit 4231 having a function to dynamically change a thinning rate in accordance with a possibility of interpolation. The thinning unit 4231 is used as the thinning unit 1231 shown in FIG. 1 or the thinning unit 2231 shown in FIG. 10.

The thinning unit 4231 has an interpolation possibility determination part 42311, a thinning rate deciding part 42312, and a thinning part 42313. Among them, the thinning part 42313 has the same function as the thinning part 32313 shown in FIG. 13.

The interpolation possibility determination part 42311 has the same function as the interpolation possibility determination unit 1331 shown in FIG. 1 and the interpolation possibility determination unit 2233 shown in FIG. 10. However, the interpolation possibility determination part 42311 has a function to output, to the thinning rate deciding part 42312, an index value indicating the degree of a possibility of interpolation calculated for the interpolation possibility determination unit 1331 and the interpolation possibility determination unit 2233 to determine whether a possibility of interpolation is present or not. As an index value indicating the degree of a possibility of interpolation, for example, the variance value of $\Delta Z_i$ shown in FIG. 9D can be used.

The thinning rate deciding part 42312 has a function to compare the index value indicating the degree of the possibility of interpolation with a threshold and decide a thinning rate.

FIG. 15 shows an example of a judgment formula used by the thinning rate deciding part 42312. A threshold $\alpha$ in FIG. 15 is the same as the threshold $\alpha$ in the formula shown in FIG. 9D. The judgment formula shown in FIG. 15 represents that if the variance value of $\Delta Z_i$ is less than the threshold $\alpha$, the variance value of $\Delta Z_i$ is further compared with a threshold $\beta$ that is less than the threshold $\alpha$ and, if the variance value of $\Delta Z_i$ is equal to or more than the threshold $\beta$, a thinning rate a is output, whereas if the variance value of $\Delta Z_i$ is still less than the threshold $\beta$, a thinning rate b that is more than the thinning rate a is output. Although the thinning rate deciding part 42312 uses one threshold $\beta$ herein, it may be configured to compare the variance value of $\Delta Z_i$ with two or more thresholds ($\beta 1$, $\beta 2$, . . . ) and decide on one thinning rate from among three or more thinning rates.

The interpolation possibility determination part 42311 and the thinning rate deciding part 42312 may be placed outside the thinning unit 4231. For example, the interpolation possibility determination part 42311 and the thinning rate deciding part 42312 may be placed at the server device. In this case, a thinning rate decided at the server device is notified to the thinning unit 4231 on the gateway device via the network.

Fifth Exemplary Embodiment

This exemplary embodiment further devises the interpolation possibility determination unit 2233 in the second exemplary embodiment mainly.

Unlike the interpolation possibility determination unit 1331 in the first exemplary embodiment placed at the server device, the interpolation possibility determination unit 2233 can refer to sensor data of devices to be removed. Therefore, the interpolation possibility determination unit 2233 can be configured to use an actual value of sensor data of devices to be removed to determine a possibility of interpolation by an interpolation unit placed at the server device.

Figure 16:
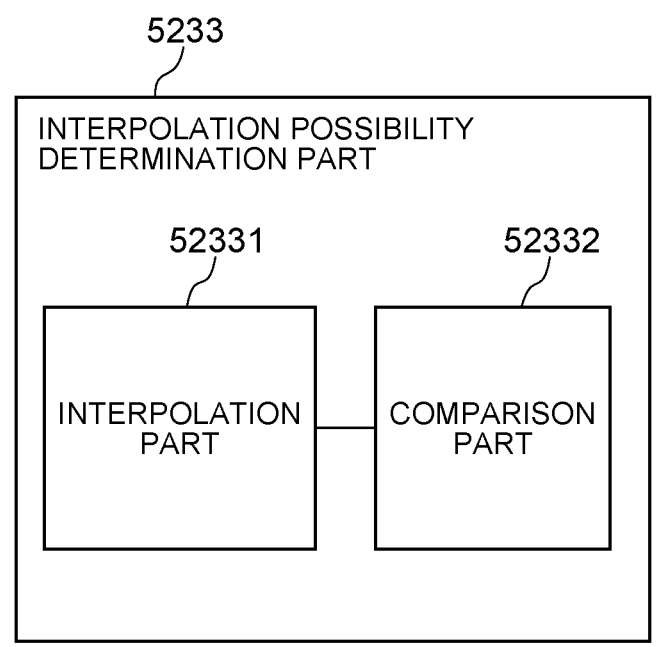
FIG. 16 is a block diagram of an interpolation possibility determination unit in a fifth exemplary embodiment of the present invention.

FIG. 16 is a block diagram of an interpolation possibility determination unit 5233 that by uses sensor data of devices to be removed to determine a possibility of interpolation. The interpolation possibility determination unit 5233 is used as the interpolation possibility determination unit 2233 shown in FIG. 10.

The interpolation possibility determination unit 5233 has an interpolation part 52331 and a comparison part 52332.

The interpolation part 52331 has a function to, on the basis of values of sensor data of transmission target devices decided by the thinning unit 2231, estimate, by interpolation, values of sensor data of devices other than the transmission target devices, namely, devices to be removed by the thinning unit 2231. That is, the interpolation part 52331 has the same function as the interpolation unit 2332 at the server device. The interpolation part 52331 outputs the estimated values of the sensor data of the devices to the comparison part 52332.

The comparison part 52332 compares values of sensor data of devices estimated by the interpolation part 52331 with values of sensor data to be thinned by the thinning unit 2231 and, on the basis of the result of the comparison, determine a possibility of interpolation by the interpolation unit 2332 at the server device. For example, for all the sensor data to be thinned, the comparison part 52332 determines that a possibility of interpolation is present if an absolute value of a difference between the estimated values of sensor data of devices and real sensor data values is within a predetermined error threshold, and determines that a possibility of interpolation is not present if not.

Sixth Exemplary Embodiment

This exemplary embodiment further devises the interpolation possibility determination unit 2233 and the thinning unit 2231 in the second exemplary embodiment mainly.

Figure 17:
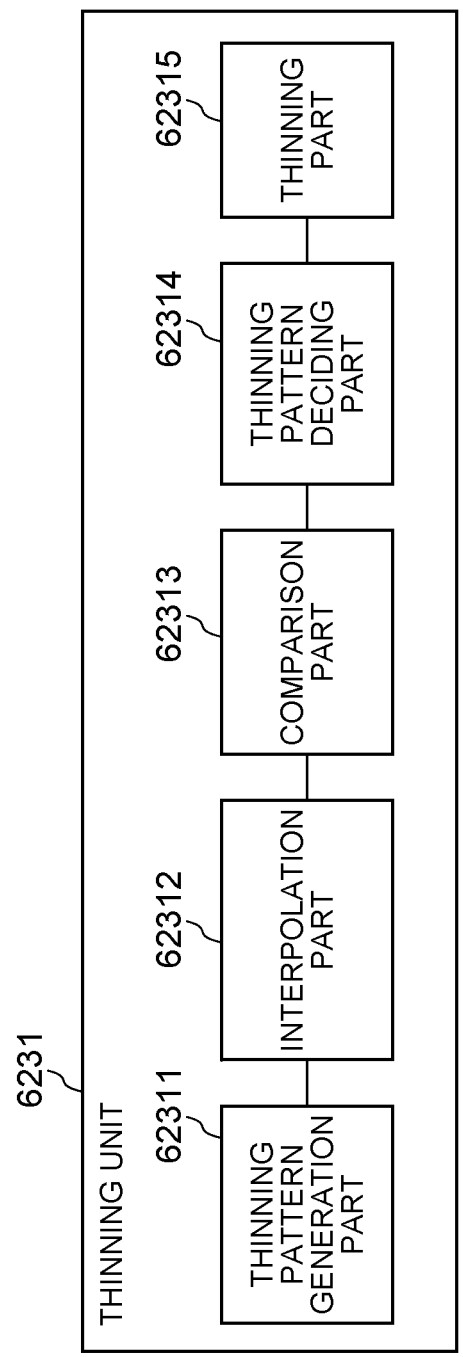
FIG. 17 is a block diagram of a thinning unit in a sixth exemplary embodiment of the present invention.

FIG. 17 is a block diagram of a thinning unit 6231 used in this exemplary embodiment. The thinning unit 6231 is used instead of the thinning unit 2231 and the interpolation possibility determination unit 2233 shown in FIG. 10.

The thinning unit 6231 has a thinning pattern generation part 62311, an interpolation part 62312, a comparison part 62313, a thinning pattern deciding part 62314, and a thinning part 62315.

The thinning pattern generation part 62311 has a function to generate a plurality of thinning patterns that are different from each other. For example, the thinning pattern generation part 62311 generates five types of thinning patterns shown in FIGS. 7A, 7B, 12A, 12B and 12C. The thinning pattern generation part 62311 outputs the generated thinning patterns to the interpolation part 62312 sequentially or collectively. However, thinning patterns generated by the thinning pattern generation part 62311 are not limited to those shown in FIGS. 7 and 12.

The interpolation part 62312 has a function to, for each thinning pattern generated by the thinning pattern generation part 62311, on the basis of values of sensor data of devices not to be removed in the thinning pattern, estimate values of sensor data of devices to be removed in the thinning pattern by interpolation. The interpolation part 62312 outputs the estimated sensor data values to the comparison part 62313.

The comparison part 62313 has a function to, for each thinning pattern, compare values of sensor data of devices estimated by the interpolation part 62312 with values of sensor data to be removed and determine a possibility of interpolation by the interpolation unit 2332 at the server device on the basis of the result of the comparison. For example, with respect to all the sensor data to be removed, the comparison part 62313 determines that a possibility of interpolation is present if an absolute value between the estimated value of sensor data of the device and real sensor data values is within a predetermined error threshold, and determines that a possibility of interpolation is not present if not.

The thinning pattern deciding part 62314 has a function to determine one thinning pattern to be used on the basis of the result of the comparison by the comparison part 62313. For example, in a case where there are a plurality of thinning patterns determined that a possibility of interpolation is present, the thinning pattern deciding part 62314 selects a thinning pattern whose thinning rate is the highest or one thinning pattern whose thinning rate is equal to or more than a threshold from among them. Moreover, in a case where the number of thinning patterns determined that a possibility of interpolation is present is one, the thinning pattern deciding part 62314 selects the one thinning pattern. Moreover, the thinning pattern deciding part 62314 determines not to remove in a case where there is no thinning pattern determined that a possibility of interpolation is present.

In a case where a thinning pattern is decided by the thinning pattern deciding part 62314, the thinning part 62315 uses the decided thinning pattern to perform thinning. That is, the thinning part 62315 thins a plurality of devices by using the decided thinning pattern, thereby selecting a plurality of transmission target devices from among the plurality of devices. Moreover, the thinning part 62315 extracts sensor data related to the selected transmission target devices from sensor data of the plurality of devices stored in the storage unit 222, and transmits the extracted sensor data to the server device 230 via the communication unit 224.

Seventh Exemplary Embodiment

This exemplary embodiment devises the method for recognizing the arrangement of a plurality of devices.

In the arrangement of a plurality of devices shown in FIG. 6, the plurality of devices are arranged in a line at given intervals in ascending order of the device IDs. However, in the actual field, the plurality of devices are not necessarily arranged in order of device IDs. Moreover, intervals between the devices are not necessarily uniform.

Figure 18:
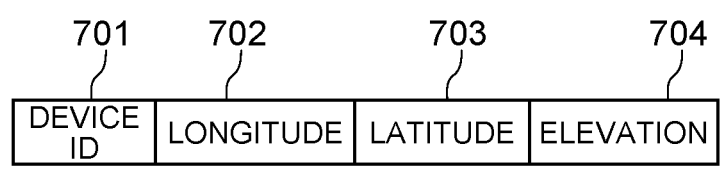
FIG. 18 is a view showing an example of a format of an entry of a correspondence table in which a device ID of a device and an arrangement place are associated with each other used in a seventh exemplary embodiment of the present invention.

In this exemplary embodiment, for example, by using a correspondence table in which the device ID of a device is associated with an arrangement place, a mutual positional relation of the plurality of devices is recognized. FIG. 18 shows an example of a format of an entry of a correspondence table in which the device ID of a device is associated with an arrangement place. In the example shown in FIG. 18, one entry of the correspondence table includes a device ID 701 and a longitude 702, a latitude 703 and an elevation 704 of a spot where the device exits. The correspondence table as shown in FIG. 18 is stored in the storage units 122, 222 and so on of the gateway device and the server device and is referred to by a unit that needs to recognize the arrangement of the plurality of devices, for example, the thinning unit, the interpolation possibility determination unit and the interpolation unit.

In the above exemplary embodiment, the plurality of devices are one-dimensionally arranged. However, the present invention can also be applied to cases where the plurality of devices are arranged two-dimensionally and three-dimensionally.

Eight Exemplary Embodiment

In this exemplary embodiment, the summary of the present invention will be described.

Figure 19:
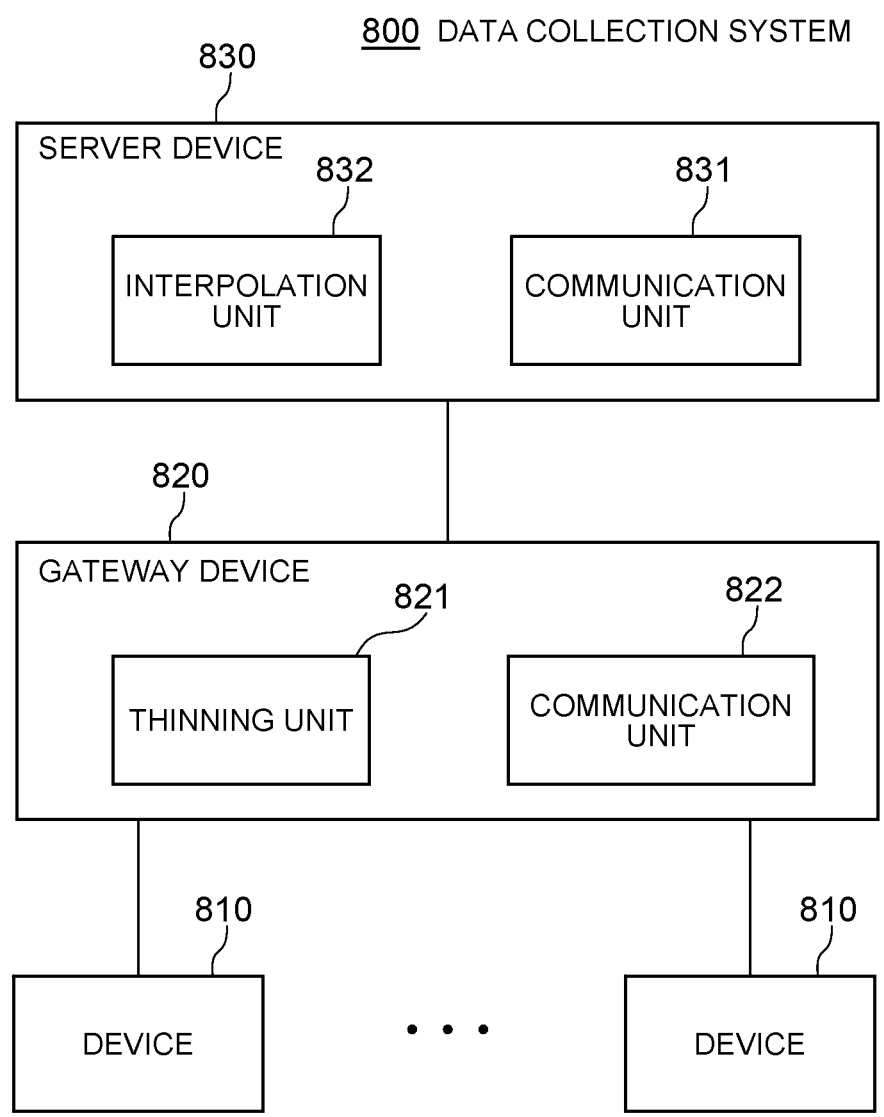
FIG. 19 is a block diagram of a data collection system according to an eighth exemplary embodiment of the present invention.

With reference to FIG. 19, a data collection system 800 according to this exemplary embodiment includes a plurality of devices 810, a gateway device 820 that collects data such as sensor data detected by a sensor from the device 810, and a server device 830 that collects the data from the gateway device 820.

The gateway device 820 has a thinning unit 821 and a communication unit 822. The thinning unit 821 has a function to thin a plurality of devices 810 to select a plurality of transmission target devices from the plurality of devices 810. The communication unit 822 has a function to transmit data of the transmission target devices to the server device 830.

The server device 830 has a communication unit 831 and an interpolation unit 832. The communication unit 831 has a function to receive the data of the transmission target devices from the gateway device 820. The interpolation unit 832 has a function to use the data of the transmission target devices to estimate values of data of removed devices by interpolation.

Figure 20:
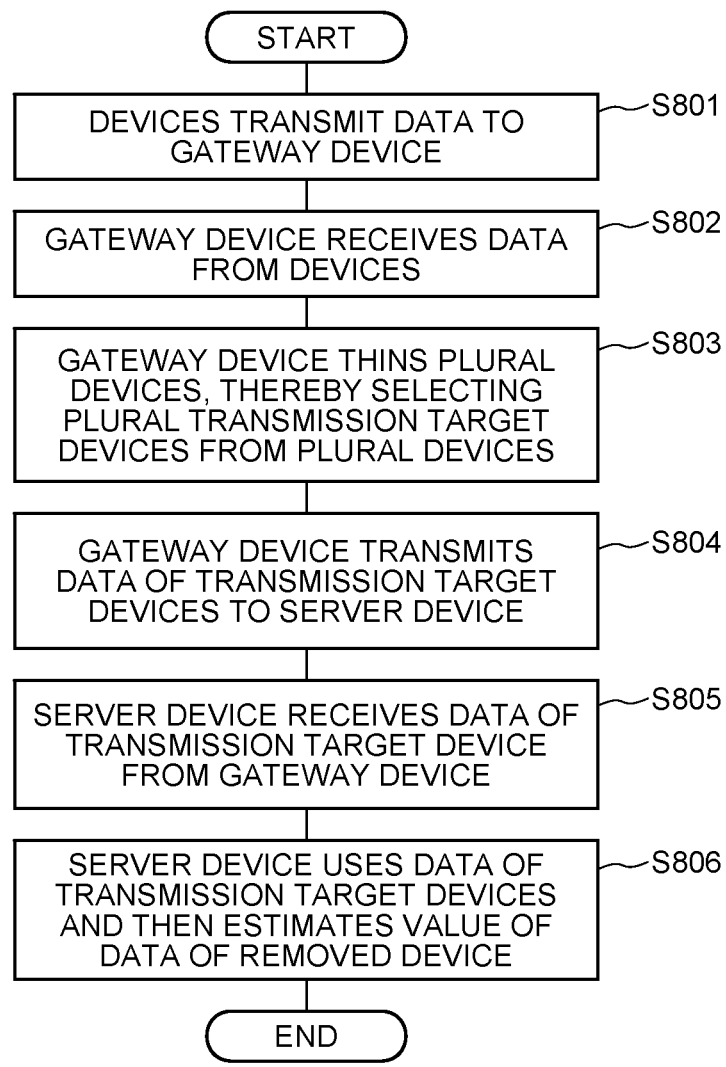
FIG. 20 is a flowchart showing an example of an operation of the data collection system according to the eighth exemplary embodiment of the present invention.

FIG. 20 is a flowchart showing a procedure of a data collection method executed by the data collection system 800 according to this exemplary embodiment. Below, with reference to FIG. 20, the procedure of the data collection method according to this exemplary embodiment will be described.

First, the devices 810 each transmit data such as sensor data detected by the sensor to the gateway device (step S801).

Upon receipt of the data from the respective devices 810 (step S802), the gateway device 820 uses the thinning unit 821 to thin the plurality of devices 810, thereby selecting a plurality of transmission target devices from among the plurality of devices 810 (step S803). Next, the gateway device 820 uses the communication unit 822 to transmit data of the transmission target devices to the server device 830 (step S804).

The server device 830 uses the communication unit 831 to receive the data of the transmission target devices from the gateway device (step S805). Next, the server device 830 uses the interpolation unit 832 to estimate values of data of removed devices 810 by interpolation by using the data of the transmission target devices (step S806).

Thus, according to this exemplary embodiment, it is possible to effectively reduce the amount of data transmitted from the gateway device 820 to the server device 830. This is because the gateway device 820 thins the plurality of devices 810 to select a plurality of transmission target devices and transmits data of the selected devices 810 to the server device 830.

Further, the server device 830 can refer to an approximate value of data of removed devices 810. This is because the server device 830 uses values of the data of the transmission target devices received from the gateway device 820 to estimate values of data of removed devices 810 by interpolation.

Although the present invention has been described above with several exemplary embodiments, the present invention is not limited to the exemplary embodiments and can be changed in various manners.

For example, interpolation auxiliary information may be transmitted from the gateway device to the server device. Interpolation auxiliary information is information used at the time of interpolation by the server device. For example, in the case of estimating a value of sensor data of a device located between two neighboring devices on the basis of an average value of the two devices, when a tendency that the estimated value increases (or decreases) at a constant rate or by a constant amount as compared with a real value is found by the interpolation possibility determination unit of the gateway device, it is possible to consider the increase rate or amount or the decrease rate or amount as interpolation auxiliary information.

In the above exemplary embodiments, the gateway device collects sensor data detected by the sensor from the device. However, data collected from the device by the gateway device is not limited to sensor data detected by the sensor. For example, the device may be a complex machine or home information appliance. In this case, the gateway device may be configured to collect setting information of the complex machine or the home information appliance and information in abnormality detection as data of the device.

For example, the server device may be a M2M platform and may be a M2M Service Infrastructure defined by oneM2M that standardizes Machine to Machine service. A M2M Service Infrastructure is equivalent to an IN (Infrastructure Node) in a oneM2M architecture. Furthermore, a M2M Service Infrastructure has a CSE (Common Services Entity) that provides common service functions (CSF) defined by oneM2M. Moreover, the server device may be a device including a plurality of CSEs. A CSE owned by an IN is also referred to as an IN (Infrastructure Node)-CSE.

Further, for example, the network between the gateway device and the server device may be a mobile communication network provided by a communication provider and may be an Underlying Network defined by oneM2M.

Further, for example, the device may be a sensor device and may be a M2M Device defined by oneM2M. A M2M device is equivalent to an ASN (Application Service Node) or an AND (Application Dedicated Node) in a oneM2M architecture, and an ASN includes a CSE. Meanwhile, a CSE in an ASN is also referred to as an ASN-CSE.

Further, for example, a user device may be a server that processes a specific job and may be a M2M Application Infrastructure defined by oneM2M. Moreover, the user device may have an AE (Application Entity) in a oneM2M architecture. An AE existing in an Infrastructure Domain defined by oneM2M and connected to an IN-CSE is also referred to as an IN (Infrastructure Node)-AE.

Further, the gateway device may be a M2M Gateway defined by oneM2M. A M2M Gateway is equivalent to a MN (Middle Node) in oneM2M architecture and has a CSE. A CSE in a MN is also referred to as a MN-CSE.

Although the present invention has been described above with reference to the exemplary embodiments, the present invention is not limited to the above exemplary embodiments. The configurations and details of the present invention can be changed in various manners that can be understood by those skilled in the art within the scope of the present invention.

The present invention is based upon and claims the benefit of priority from Japanese patent application No. 2015-241130, filed on Dec. 10, 2015, the disclosure of which is incorporated herein in its entirety by reference.

INDUSTRIAL APPLICABILITY

The present invention can be used for a general sensor network system.

The whole or part of the exemplary embodiments disclosed above can be described as, but not limited to, the following supplementary notes.

[Supplementary Note 1]

A data collection system comprising a gateway device configured to collect data from a plurality of devices and a server device configured to collect the data from the gateway device, wherein:
the gateway device includes:
a thinning means configured to select a plurality of transmission target devices from among the plurality of devices; and
a communication means configured to transmit the data of the transmission target devices to the server device; and
the server device includes:
a communication means configured to receive the data of the transmission target devices from the gateway device; and
an interpolation means configured to use the data of the transmission target devices to perform estimation, by interpolation, of values of the data of devices having not been selected from among the plurality of devices.

[Supplementary Note 2]

The data collection system according to Supplementary Note 1, wherein the server device includes an interpolation possibility determination means configured to determine a possibility of the interpolation on a basis of a history of the data of the transmission target devices.

[Supplementary Note 3]

The data collection system according to Supplementary Note 1 or 2, wherein the server device includes a request means configured to, in a case where the estimation by the interpolation is not performed, transmit a request for the data of the devices having not been selected to the gateway device.

[Supplementary Note 4]

The data collection system according to any of Supplementary Notes 1 to 3, wherein the gateway device includes a request response means configured to, upon receipt of a request from the server device, transmit the data of the devices having not been selected as the transmission target devices to the server device.

[Supplementary Note 5]

The data collection system according to Supplementary Note 1, wherein the gateway device includes an interpolation possibility determination means configured to determine a possibility of the interpolation on a basis of a history of the data of the transmission target devices.

[Supplementary Note 6]

The data collection system according to Supplementary Note 1, wherein the gateway device includes an interpolation possibility determination means configured to determine a possibility of the interpolation on a basis of the data of the transmission target devices and the data of devices having not been selected.

[Supplementary Note 7]

The data collection system according to Supplementary Note 1, wherein the gateway device includes an interpolation possibility determination means configured to perform estimation, by interpolation, of values of the data of devices having not been selected on a basis of the data of the transmission target devices and determine a possibility of the interpolation on a basis of a result of comparison of the estimated values with values of the data of the devices having not been selected.

[Supplementary Note 8]

The data collection system according to any of Supplementary Notes 5 to 7, wherein the interpolation possibility determination means is configured to, on a basis of the possibility of the interpolation, control whether or not the thinning means selects all of the plurality of devices as the transmission target devices.

[Supplementary Note 9]

The data collection system according to any of Supplementary Notes 5 to 7, wherein the interpolation possibility determination means is configured to, on a basis of whether or not the possibility of the interpolation is present, determine whether or not to transmit the data of some of the plurality of devices to the server device.

[Supplementary Note 10]

The data collection system according to Supplementary Note 1, wherein the thinning means is configured to, before selecting the transmission target devices, for each of a plurality of thinning patterns, use the data of the transmission target devices to estimate, by interpolation, the values of the data of the devices not to be selected as the transmission target devices, compare the estimated values with the values of the data of the devices not to be selected as the transmission target devices to determine a possibility of the interpolation, and decide a thinning pattern that a thinning rate becomes largest or becomes equal to or more than a threshold from among thinning patterns that a possibility of the interpolation is present, the thinning rate being a ratio of a number of the devices not to be selected as the transmission target devices to a total number of the plurality of devices.

[Supplementary Note 11]

The data collection system according to any of Supplementary Notes 1 to 10, wherein the thinning means is configured to select the transmission target devices from among the plurality of devices at random.

[Supplementary Note 12]

The data collection system according to any of Supplementary Notes 1 to 10, wherein the thinning means is configured to select one thinning method to be used from among a plurality of selection methods for selecting the transmission target devices from among the plurality of devices.

[Supplementary Note 13]

The data collection system according to any of Supplementary Notes 1 to 10, wherein the thinning means is configured to select and use in order selection methods by which mutually different devices are not selected, from among a plurality of selection methods for selecting the transmission target devices from among the plurality of devices.

[Supplementary Note 14]

The data collection system according to any of Supplementary Notes 1 to 10, wherein the thinning means is configured to decide a thinning rate according to a condition of a load on a network between the gateway device and the server device, the thinning rate being a ratio of a number of the devices not to be selected as the transmission target devices to a total number of the plurality of devices.

[Supplementary Note 15]

The data collection system according to any of Supplementary Notes 1 to 10, wherein the thinning means is configured to determine a possibility of interpolation of values of the data of the devices having not been selected as the transmission target devices by using the data of the transmission target devices, on a basis of history of the data of the transmission target devices and, according to the determined possibility of the interpolation, decide a thinning rate that is a ratio of a number of the devices not to be selected as the transmission target devices to a total number of the plurality of devices.

[Supplementary Note 16]

The data collection system according to any of Supplementary Notes 1 to 3, wherein the gateway device includes a request response means configured to, upon receipt of a request from the server device, transmit the data of the devices having not been selected as the transmission target devices to the server device.

[Supplementary Note 17]

A data collection method executed by a data collection system including a gateway device configured to collect data from a plurality of devices and a server device configured to collect the data from the gateway device, the data collection method comprising:

by the gateway device, selecting a plurality of transmission target devices from among the plurality of devices, and transmitting the data of the transmission target devices to the server device; and by the server device, receiving the data of the transmission target devices from the gateway device, and using the data of the transmission target devices to perform estimation, by interpolation, of values of the data of devices having not been selected from among the plurality of devices.

[Supplementary Note 18]

A gateway device collecting data from a plurality of devices and transmitting the data to a server device, the gateway device comprising:

a thinning means configured to select a plurality of transmission target devices from among the plurality of devices; and a communication means configured to transmit the data of the transmission target devices to the server device.

[Supplementary Note 19]

The gateway device according to Supplementary Note 18, comprising a request response means configured to, upon receipt of a request from the server device, transmit the data of the devices having not been selected as the transmission target devices to the server device.

[Supplementary Note 20]

The gateway device according to Supplementary Note 18, comprising an interpolation possibility determination means configured to determine a possibility of interpolation of values of the data of the devices having not been selected as the transmission target devices by using the data of the transmission target devices, on a basis of a history of the data of the transmission target devices.

[Supplementary Note 21]

The gateway device according to Supplementary Note 18, comprising an interpolation possibility determination means configured to determine a possibility of interpolation of values of the data of the devices having not been selected as the transmission target devices by using the data of the transmission target devices, on a basis of the data of the transmission target devices and the data of the devices having not been selected as the transmission target devices.

[Supplementary Note 22]

The gateway device according to Supplementary Note 18, comprising an interpolation possibility determination means configured to perform estimation, by interpolation, of values of the data of the devices having not been selected as the transmission target devices by using the data of the transmission target devices and determine a possibility of the interpolation on a basis of a result of comparison of the estimated values with the values of the data of the devices having not been selected as the transmission target devices.

[Supplementary Note 23]

The gateway device according to any of Supplementary Notes 20 to 22, wherein the interpolation possibility determination means is configured to, on a basis of the possibility of the interpolation, control whether or not the thinning means selects all of the plurality of devices as the transmission target devices.

[Supplementary Note 24]

The gateway device according to any of Supplementary Notes 20 to 22, wherein the interpolation possibility determination means is configured to, on a basis of whether or not the possibility of the interpolation is present, determine whether or not to transmit the data of some of the plurality of devices to the server device.

[Supplementary Note 25]

The gateway device according to Supplementary Note 18, wherein the thinning means is configured to, before selecting the transmission target devices, for each of a plurality of thinning patterns, use the data of the transmission target devices to estimate, by interpolation, the values of data of the devices not to be selected as the transmission target devices, compare the estimated values with the values of the data of the devices not to be selected as the transmission target devices to determine a possibility of the interpolation, and decide a thinning pattern that a thinning rate becomes largest or becomes equal to or more than a threshold from among thinning patterns that a possibility of the interpolation is present, the thinning rate being a ratio of a number of the devices not to be selected as the transmission target devices to a total number of the plurality of devices.

[Supplementary Note 26]

The gateway device according to any of Supplementary Notes 18 to 25, wherein the thinning means is configured to select the transmission target devices from among the plurality of devices at random.

[Supplementary Note 27]

The gateway device according to any of Supplementary Notes 18 to 25, wherein the thinning means is configured to select one thinning method to be used from among a plurality of selection methods for selecting the transmission target devices from among the plurality of devices.

[Supplementary Note 28]

The gateway device according to any of Supplementary Notes 18 to 25, wherein the thinning means is configured to select and use in order selection methods by which mutually different devices are not selected, from among a plurality of selection methods for selecting the transmission target devices from among the plurality of devices.

[Supplementary Note 29]

The gateway device according to any of Supplementary Notes 18 to 25, wherein the thinning means is configured to decide a thinning rate according to a condition of a load on a network between the gateway device and the server device, the thinning rate being a ratio of a number of the devices not to be selected as the transmission target devices to a total number of the plurality of devices.

[Supplementary Note 30]

The gateway device according to any of Supplementary Notes 18 to 25, wherein the thinning means is configured to determine a possibility of interpolation of values of the data of the devices having not been selected as the transmission target devices by using the data of the transmission target devices, on a basis of history of the data of the transmission target devices and, according to the determined possibility of the interpolation, decide a thinning rate that is a ratio of a number of the devices not to be selected as the transmission target devices to a total number of the plurality of devices.

[Supplementary Note 31]

The gateway device according to Supplementary Note 18, comprising a request response means configured to, upon receipt of a request from the server device, transmit the data of the devices having not been selected as the transmission target devices to the server device.

[Supplementary Note 32]

A server device collecting data from a gateway device collecting the data from a plurality of devices, the server device comprising:

a communication means configured to receive, from the gateway device, the data of transmission target devices selected from among the plurality of devices; and an interpolation means configured to use the data of the transmission target devices to perform estimation, by interpolation, of values of the data of the devices having not been selected from among the plurality of devices.

[Supplementary Note 33]

The server device according to Supplementary Note 32, comprising an interpolation possibility determination means configured to determine a possibility of the interpolation on a basis of a history of the data of the transmission target devices.

[Supplementary Note 34]

The server device according to Supplementary Note 32 or 33, comprising a request means configured to, in a case where the estimation by the interpolation is not performed, transmit a request for the data of the devices having not been selected to the gateway device.

[Supplementary Note 35]

A computer program comprising instructions for causing a computer collecting data from a plurality of devices and transmitting the data to a server device to function as:

a thinning means configured to select a plurality of transmission target devices from among the plurality of devices; and a communication means configured to transmit the data of the transmission target devices to the server device.

[Supplementary Note 36]

A computer program comprising instructions for causing a computer collecting data from a gateway device collecting the data from a plurality of devices to function as:

a communication means configured to receive, from the gateway device, the data of transmission target devices selected from among the plurality of devices; and an interpolation means configured to use the data of the transmission target devices to perform estimation, by interpolation, of values of the data of the devices having not been selected from among the plurality of devices.

DESCRIPTION OF NUMERALS 100 sensor data collection system
110 device
111 sensor
112 sensor data
113 device ID
114 sensor ID
115 detection time
116 detection value
120 gateway device
121 communication unit
122 storage unit
123 processing unit
1231 thinning unit
1232 request response unit
124 communication unit
130 server device
131 communication unit
132 storage unit
133 processing unit
1331 interpolation possibility determination unit
1332 interpolation unit
1333 request unit
134 communication unit
140 user device
150 network
160 network
170 network
180 information processing device
181 arithmetic processing device
182 storage part
183 first communication module
184 second communication module
185 program
190 information processing device
191 arithmetic processing device
192 storage part
193 first communication module
194 second communication module
195 program
200 sensor data collection system
210 device
211 sensor
220 gateway device
221 communication unit
222 storage unit
223 processing unit
2231 thinning unit
2233 interpolation possibility determination unit
224 communication unit
230 server device
231 communication unit
232 storage unit
233 processing unit
2332 interpolation unit
234 communication unit
240 user device
250 network
260 network
270 network
3231 thinning unit
32311 network load measurement part
32312 thinning rate deciding part
32313 thinning part
4231 thinning unit
42311 interpolation possibility determination part
42312 thinning rate deciding part
42313 thinning part
5233 interpolation possibility determination part
52331 interpolation part
52332 comparison part
6231 thinning unit 62311 thinning pattern generation part
62312 interpolation part
62313 comparison part
62314 thinning pattern deciding part
62315 thinning part
701 device ID
702 longitude
703 latitude
704 elevation
800 data collection system
810 device
820 gateway device
821 thinning unit
822 communication unit
830 server device
831 communication unit
832 interpolation unit

The invention claimed is:

1. A gateway device collecting data from a plurality of devices and transmitting the data to a server device, the gateway device comprising at least one processor configured to implement:
a thinning unit configured to select a plurality of transmission target devices from among the plurality of devices; and
a communication unit configured to transmit the data of the transmission target devices to the server device,
wherein the processor is configured to further implement an interpolation possibility determination unit configured to determine a possibility of interpolation of values of the data of the devices having not been selected as the transmission target devices by using the data of the transmission target devices, on a basis of a history of the data of the transmission target devices, and
wherein the interpolation possibility determination unit is configured to, on a basis of the possibility of the interpolation, control whether or not the thinning unit selects all of the plurality of devices as the transmission target devices.

2. A gateway device collecting data from a plurality of devices and transmitting the data to a server device, the gateway device comprising at least one processor configured to implement:
a thinning unit configured to select a plurality of transmission target devices from among the plurality of devices; and
a communication unit configured to transmit the data of the transmission target devices to the server device,
wherein the processor is configured to further implement an interpolation possibility determination unit configured to determine a possibility of interpolation of values of the data of the devices having not been selected as the transmission target devices by using the data of the transmission target devices, on a basis of a history of the data of the transmission target devices, and
wherein the interpolation possibility determination unit is configured to, on a basis of whether or not the possibility of the interpolation is present, determine whether or not to transmit the data of some of the plurality of devices to the server device.

3. A gateway device collecting data from a plurality of devices and transmitting the data to a server device, the gateway device comprising at least one processor configured to implement:
a thinning unit configured to select a plurality of transmission target devices from among the plurality of devices; and
a communication unit configured to transmit the data of the transmission target devices to the server device,
wherein the thinning unit is configured to, before selecting the transmission target devices, for each of a plurality of thinning patterns, use the data of the transmission target devices to estimate, by interpolation, the values of data of the devices not to be selected as the transmission target devices, compare the estimated values with the values of the data of the devices not to be selected as the transmission target devices to determine a possibility of the interpolation, and decide a thinning pattern that a thinning rate becomes largest or becomes equal to or more than a threshold from among thinning patterns that a possibility of the interpolation is present, the thinning rate being a ratio of a number of the devices not to be selected as the transmission target devices to a total number of the plurality of devices.

4. A gateway device collecting data from a plurality of devices and transmitting the data to a server device, the gateway device comprising at least one processor configured to implement:
a thinning unit configured to select a plurality of transmission target devices from among the plurality of devices; and
a communication unit configured to transmit the data of the transmission target devices to the server device,
wherein the thinning unit is configured to decide a thinning rate according to a condition of a load on a network between the gateway device and the server device, the thinning rate being a ratio of a number of the devices not to be selected as the transmission target devices to a total number of the plurality of devices.

5. A gateway device collecting data from a plurality of devices and transmitting the data to a server device, the gateway device comprising at least one processor configured to implement:
a thinning unit configured to select a plurality of transmission target devices from among the plurality of devices; and
a communication unit configured to transmit the data of the transmission target devices to the server device,
wherein the thinning unit is configured to determine a possibility of interpolation of values of the data of the devices having not been selected as the transmission target devices by using the data of the transmission target devices, on a basis of a history of the data of the transmission target devices and, according to the determined possibility of the interpolation, decide a thinning rate that is a ratio of a number of the devices not to be selected as the transmission target devices to a total number of the plurality of devices.

6. A method executed by a gateway device configured to collect data from a plurality of devices and transmit the data to a server device, the method comprising:
selecting a plurality of transmission target devices from among the plurality of devices; and
transmitting the data of the transmission target devices to the server device,
the method further comprising, in selecting the transmission target devices, before selecting the transmission target devices, for each of a plurality of thinning patterns, using the data of the transmission target devices to estimate, by interpolation, values of the data of the devices not to be selected as the transmission target devices, comparing the estimated values with the values of the data of the devices not to be selected as the transmission target devices to determine a possibility of the interpolation, and deciding a thinning pattern that a thinning rate becomes largest or becomes equal to or more than a threshold from among thinning patterns that a possibility of the interpolation is present, the thinning rate being a ratio of a number of the devices not to be selected as the transmission target devices to a total number of the plurality of devices.

* * * * *